US010507789B2

(12) United States Patent
Yanagawa et al.

(10) Patent No.: US 10,507,789 B2
(45) Date of Patent: Dec. 17, 2019

(54) WEBBING TAKE-UP DEVICE

(71) Applicant: KABUSHIKI KAISHA TOKAI-RIKA-DENKI-SEISAKUSHO, Aichi (JP)

(72) Inventors: Wataru Yanagawa, Aichi (JP); Motoki Sugiyama, Aichi (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 150 days.

(21) Appl. No.: 15/554,334

(22) PCT Filed: Mar. 2, 2016

(86) PCT No.: PCT/JP2016/056503
§ 371 (c)(1),
(2) Date: Aug. 29, 2017

(87) PCT Pub. No.: WO2016/143644
PCT Pub. Date: Sep. 15, 2016

(65) Prior Publication Data
US 2018/0037192 A1 Feb. 8, 2018

(30) Foreign Application Priority Data

Mar. 6, 2015 (JP) .................. 2015-045135

(51) Int. Cl.
*B60R 22/36* (2006.01)
*B60R 22/46* (2006.01)
*B60R 22/02* (2006.01)

(52) U.S. Cl.
CPC .......... *B60R 22/4676* (2013.01); *B60R 22/36* (2013.01); *B60R 2022/026* (2013.01)

(58) Field of Classification Search
CPC . B60R 22/36; B60R 22/4676; B60R 22/4633; B60R 2022/287; B60R 2022/4642
See application file for complete search history.

(56) References Cited

U.S. PATENT DOCUMENTS

| 6,616,081 B1 | 9/2003 | Clute et al. |
| 2008/0087754 A1 | 4/2008 | Aihara et al. |
| (Continued) | | |

FOREIGN PATENT DOCUMENTS

| JP | 2003-502204 A | 1/2003 |
| JP | 2008-094280 A | 4/2008 |

OTHER PUBLICATIONS

International Search Report issued in a corresponding application PCT/JP2016/056503 dated Apr. 19, 2016.

*Primary Examiner* — Sang K Kim
(74) *Attorney, Agent, or Firm* — Roberts Mlotkowski Safran Cole & Calderon P.C.

(57) ABSTRACT

An increase in structural complexity is suppressed in a webbing take-up device provided with a force limiter load switching mechanism and a pre-tensioner mechanism. The webbing take-up device includes a spool that takes up a webbing, a pre-tensioner mechanism that takes up the webbing onto the spool by rotating the spool in the take-up direction in a vehicle emergency, and a lock mechanism that restricts pull-out direction rotation of the spool in a vehicle emergency. The webbing take-up device further includes a force limiter mechanism that permits pull-out direction rotation of the spool at a force limiter load or greater when the lock mechanism has restricted pull-out direction rotation of the spool, and a force limiter load switching mechanism that switches a force limiter load value by being input with a portion of an actuation force that actuates the pre-tensioner mechanism.

8 Claims, 12 Drawing Sheets

(56) References Cited

U.S. PATENT DOCUMENTS

| | | | | |
|---|---|---|---|---|
| 2012/0175451 A1* | 7/2012 | Yanagawa | ........... | B60R 22/3413 |
| | | | | 242/379.1 |
| 2012/0318904 A1* | 12/2012 | Ukita | .................. | B60R 22/3413 |
| | | | | 242/379.1 |
| 2013/0233958 A1* | 9/2013 | Yanagawa | ........... | B60R 22/3413 |
| | | | | 242/379.1 |
| 2013/0240655 A1* | 9/2013 | Yanagawa | ................ | B60R 22/34 |
| | | | | 242/407 |
| 2013/0256440 A1* | 10/2013 | Maekubo | ............ | B60R 22/4628 |
| | | | | 242/374 |
| 2013/0264408 A1* | 10/2013 | Maekubo | ............ | B60R 22/3413 |
| | | | | 242/379.1 |

\* cited by examiner

WEBBING TAKE-UP DEVICE

CROSS-REFERENCE TO RELATED APPLICATIONS

The present application is a U.S. National Phase of PCT/JP2016/0565 filed on Mar. 2, 2016 claiming priority to Japanese Patent application No. 2015-045135 filed Mar. 6, 2015. The disclosure of the PCT Application is hereby incorporated by reference into the present Application.

TECHNICAL FIELD

The present invention relates to a webbing take-up device.

BACKGROUND ART

Japanese National-Phase Publication No. 2003-502204 describes a webbing take-up device in which a piston employs the pressure of gas, that is generated by a gas generator, to push a stepped portion of an operation ring in order to switch a load value of a force limiter load value.

SUMMARY OF INVENTION

Technical Problem

However, webbing take-up devices, that includes both a force limiter load switching mechanism that switches a force limiter load value and a pre-tensioner mechanism that rotates a spool in a take-up direction in a vehicle emergency, are provided with both an actuator (such as a gas generator) for switching the force limiter load value and an actuator for rotating the spool in the take-up direction, resulting the webbing take-up device having a complex structure.

In consideration of the above circumstances, an object of the present invention is to suppress an increase in the complexity of the structure of a webbing take-up device including both a force limiter load switching mechanism and a pre-tensioner mechanism.

Solution to Problem

A webbing take-up device of a first aspect of the present disclosure includes a spool, a pre-tensioner mechanism, a lock mechanism, a force limiter mechanism, and a force limiter load switching mechanism. The spool takes up a webbing, which is configured to be worn by an occupant, by being rotated in a take-up direction, and is rotated in a pull-out direction by the webbing being pulled out. The pre-tensioner mechanism takes up the webbing onto the spool by rotating the spool in the take-up direction in a vehicle emergency. The lock mechanism restricts pull-out direction rotation of the spool in a vehicle emergency. The force limiter mechanism permits pull-out direction rotation of the spool in a case in which the lock mechanism has restricted pull-out direction rotation of the spool, and is configured to set a force limiter load value, at which the force limiter mechanism actuates, to a high load value or to a low load value. The force limiter load switching mechanism switches the force limiter load value by being input with a portion of an actuation force that actuates the pre-tensioner mechanism.

A webbing take-up device of a second aspect of present disclosure is the webbing take-up device of the first aspect, wherein the force limiter load value is switchable from a high load value to a low load value upon actuation of the pre-tensioner mechanism.

A webbing take-up device of a third aspect of the present disclosure is the webbing take-up device of the first aspect or the second aspect, wherein the force limiter load switching mechanism is configured including a first rotating body, a second rotating body, a coupling member, a switching rotating body, and a rotation restriction member. The first rotating body is rotated by being input with a portion of the actuation force that actuates the pre-tensioner mechanism. The second rotating body is rotated by rotational force transmitted from the first rotating body. The coupling member engages with the first rotating body and the second rotating body so as to couple the first rotating body with the second rotating body to enable the first rotating body and the second rotating body to rotate together as a unit, or adopts a state of t non-engagement with the first rotating body and the second rotating body such that rotational force of the first rotating body is not transmitted to the second rotating body. The switching rotating body switches the force limiter load value by being switched to a rotation-restricted state or a rotation-enabled state. The rotation restriction member is provided between the second rotating body and the switching rotating body, restricts rotation of the switching rotating body by engaging with the switching rotating body, and is displaced between a state of engagement with the switching rotating body and a state of non-engagement with the switching rotating body when the second rotating body is rotated.

A webbing take-up device of a fourth aspect of the present disclosure is the webbing take-up device of the third aspect, wherein the first rotating body and the second rotating body are each formed in a circular plate shape. Moreover, a first rotating body side engagement groove for the coupling member to engage with is formed at an outer peripheral portion of the first rotating body, the first rotating body side engagement groove being open at a radial direction outer side and closed at a radial direction inner side and being inclined toward one side in a circumferential direction on progression toward the radial direction inner side. A second rotating body side engagement groove for the coupling member to engage with is formed at an outer peripheral portion of the second rotating body, the second rotating body side engagement groove being open at a radial direction outer side and closed at a radial direction inner side, and being inclined toward another side in the circumferential direction on progression toward the radial direction inner side.

A webbing take-up device of a fifth aspect of the present disclosure is the webbing take-up device of the first aspect or the second aspect, wherein the force limiter load switching mechanism is configured including a rotating body, an urging member, and a trigger member. The rotating body switches the force limiter load value by being rotated toward one side. The urging member urges the rotating body toward the one side. The trigger member prevents rotation of the rotating body by engaging with the rotating body, and is released from engagement with the rotating body by being input with a portion of the actuation force that actuates the pre-tensioner mechanism.

A webbing take-up device of a sixth aspect of the present disclosure is the webbing take-up device of the fifth aspect, further including a rotation restriction member that restricts rotation of the rotating body by engaging with the rotating body, and that is displaced between a state of engagement with the rotating body and a state of non-engagement with the rotating body.

A webbing take-up device of a seventh aspect of the present disclosure is the webbing take-up device of any one of the first aspect to the sixth aspect, wherein the force limiter load switching mechanism switches the force limiter load value according to an amount of the webbing that is pulled out from the spool.

A webbing take-up device of an eighth aspect of the present disclosure is the webbing take-up device of any one of the first aspect to the seventh aspect, wherein the force limiter load switching mechanism is configured to set the force limiter load value to a high load value or a low load value in accordance with an amount of the webbing that is pulled out from the spool, and the force limiter load switching mechanism switches between the high load value and the low load value.

Advantageous Effects of Invention

In the webbing take-up device of the first aspect of the present disclosure, the spool takes up the webbing worn by an occupant. The spool rotates in the pull-out direction by the webbing being pulled out from the spool, and the webbing is taken up on the spool by rotating the spool in the take-up direction.

In a vehicle emergency, the pre-tensioner mechanism is actuated such that the webbing is taken up onto the spool. This removes any slack in the webbing worn by the occupant.

Moreover, in a vehicle emergency, the lock mechanism is actuated to restrict pull-out direction rotation of the spool. The webbing is thus restricted from being pulled out from the spool such that the occupant is restrained by the webbing.

Moreover, in a state in which pull-out direction rotation of the spool is restricted, when load from the occupant acting on the webbing exceeds a predetermined value (force limiter load value), pull-out direction rotation of the spool is permitted. Kinetic energy of the occupant is thereby absorbed and the load acting on the occupant from the webbing is reduced.

In the first aspect, a portion of the actuation force that actuates the pre-tensioner mechanism is input to the force limiter load switching mechanism in order to switch the force limiter load value. In other words, the force limiter load switching mechanism can be actuated without providing an actuator solely for the purpose of actuating the force limiter load switching mechanism. This thereby enables an increase in structural complexity to be suppressed in comparison to a webbing take-up device provided with an actuator solely for the purpose of actuating the force limiter load switching mechanism in addition to an actuator provided solely for the purpose of actuating the pre-tensioner mechanism.

In the webbing take-up device of the second aspect of the present disclosure, the force limiter load value can be switched from a high load value to a low load value by actuating the pre-tensioner mechanism. In other words, configuration is made such that the force limiter load value is the high load value in cases in which the pre-tensioner mechanism does not actuate. Accordingly, for example, the force limiter load value can be prevented from switching to a low load in cases in which actuation of the pre-tensioner mechanism is delayed as a result of late collision detection or the like, or in cases in which a collision cannot be detected as a result of a sensor fault or the like, resulting in the pre-tensioner mechanism not being actuated.

In the webbing take-up device of the third aspect of the present disclosure, when the pre-tensioner mechanism is actuated in a state in which the coupling member is engaged with neither the first rotating body nor the second rotating body, the first rotating body receives an actuation force from the pre-tensioner mechanism and is rotated. In a state in which the coupling member is engaged to neither the first rotating body nor the second rotating body, rotation force of the first rotating body is not input to the second rotating body. The rotation restriction member thereby remains engaged with the switching rotating body.

By contrast, when the pre-tensioner mechanism is actuated in a state in which the coupling member is engaged with the first rotating body and the second rotating body, the first rotating body receives an actuation force from the pre-tensioner mechanism and is rotated. Moreover, the second rotating body receives rotation force from the first rotating body and is rotated. The rotation restriction member is thereby displaced from a state in which the rotation restriction member is engaged with the switching rotating body to a state in which the rotation restriction member is not engaged with the switching rotating body, enabling the switching rotating body to rotate. Namely, the force limiter load value is switched.

As explained above, in the webbing take-up device of the third aspect, it is possible to select whether or not to switch the force limiter load value accompanying actuation of the pre-tensioner mechanism.

In the webbing take-up device of the fourth aspect of the present disclosure, the first rotating body side engagement groove and the second rotating body side engagement groove are inclined in the manner described above. Accordingly, in a state in which the center of the coupling member is positioned even slightly further toward the closed end side of the first rotating body side engagement groove and the second rotating body side engagement groove from the open ends of first rotating body side engagement groove and the second rotating body side engagement groove, when the first rotating body rotates and the coupling member abuts the sides of the open ends of the first rotating body side engagement groove and the second rotating body side engagement groove, the coupling member is scooped in toward the closed end side of the first rotating body side engagement groove and the second rotating body side engagement groove. Namely, a state is attained in which the coupling member is engaged with the first rotating body and the second rotating body.

By contrast, in a state in which the center of the coupling member is positioned even slightly further to the radial direction outer side of the first rotating body and the second rotating body from the open ends of the first rotating body side engagement groove and the second rotating body side engagement groove, when the first rotating body rotates and the coupling member abuts the sides of the open ends of the first rotating body side engagement groove and the second rotating body side engagement groove, the coupling member is pushed away toward the opposite direction to the closed end sides of the first rotating body side engagement groove and the second rotating body side engagement groove. Namely, a state is attained in which the coupling member is not engaged with the first rotating body and the second rotating body.

As described above, in the webbing take-up device of the fourth aspect, in a state in which the center of the coupling member is positioned even slightly further toward the closed end side of the first rotating body side engagement groove and the second rotating body side engagement groove from the open ends of first rotating body side engagement groove and the second rotating body side engagement groove, a state in which the coupling member is engaged with the first rotating body and the second rotating body can be attained. In a state in which the center of the coupling member is positioned even slightly further to the radial direction outer side of the first rotating body and the second rotating body from the open ends of the first rotating body side engagement groove and the second rotating body side engagement groove, a state in which the coupling member is not engaged with the first rotating body and the second rotating body can attained.

In the webbing take-up device of the fifth aspect of the present disclosure, when the trigger member is input with a portion of the actuation force that actuates the pre-tensioner mechanism, the engagement between the trigger member and the rotating body is released. Thus, the rotating body is rotated toward the one side by the urging force of the urging member, thereby switching the force limiter load value. In the present invention, configuration is made in which the rotating body is rotated by the urging force of the urging member, thereby enabling the energy value input from the pre-tensioner mechanism to the force limiter load switching mechanism to be made smaller.

In the webbing take-up device of the sixth aspect of the present disclosure, in a state in which the rotation restriction member is engaged with the rotating body, the rotation restriction member restricts rotation of the rotating body even when the engagement between the trigger member and the rotating body has been released. In a state in which the rotation restriction member is not engaged with the rotating body, rotation of the rotating body is permitted when the engagement between the trigger member and the rotating body is released. The rotating body is thereby rotated toward the one side by the urging force of the urging member, thus switching the force limiter load value. In the present disclosure, due to providing the above rotation restriction member, it is possible to select whether or not rotation of the rotating body is permitted by the rotation restriction member, regardless of whether or not the trigger member and the rotating body are engaged with each other.

In the webbing take-up device of the seventh aspect and the eighth aspect of the present disclosure, the force limiter load value can be switched according to an amount of the webbing that is pulled out from the spool, namely, according to the build of the occupant.

DESCRIPTION OF EMBODIMENTS

First Exemplary Embodiment

Explanation follows regarding a webbing take-up device according to a first exemplary embodiment of the present invention, with reference to FIG. 1 to FIG. 7.

Figure 1:
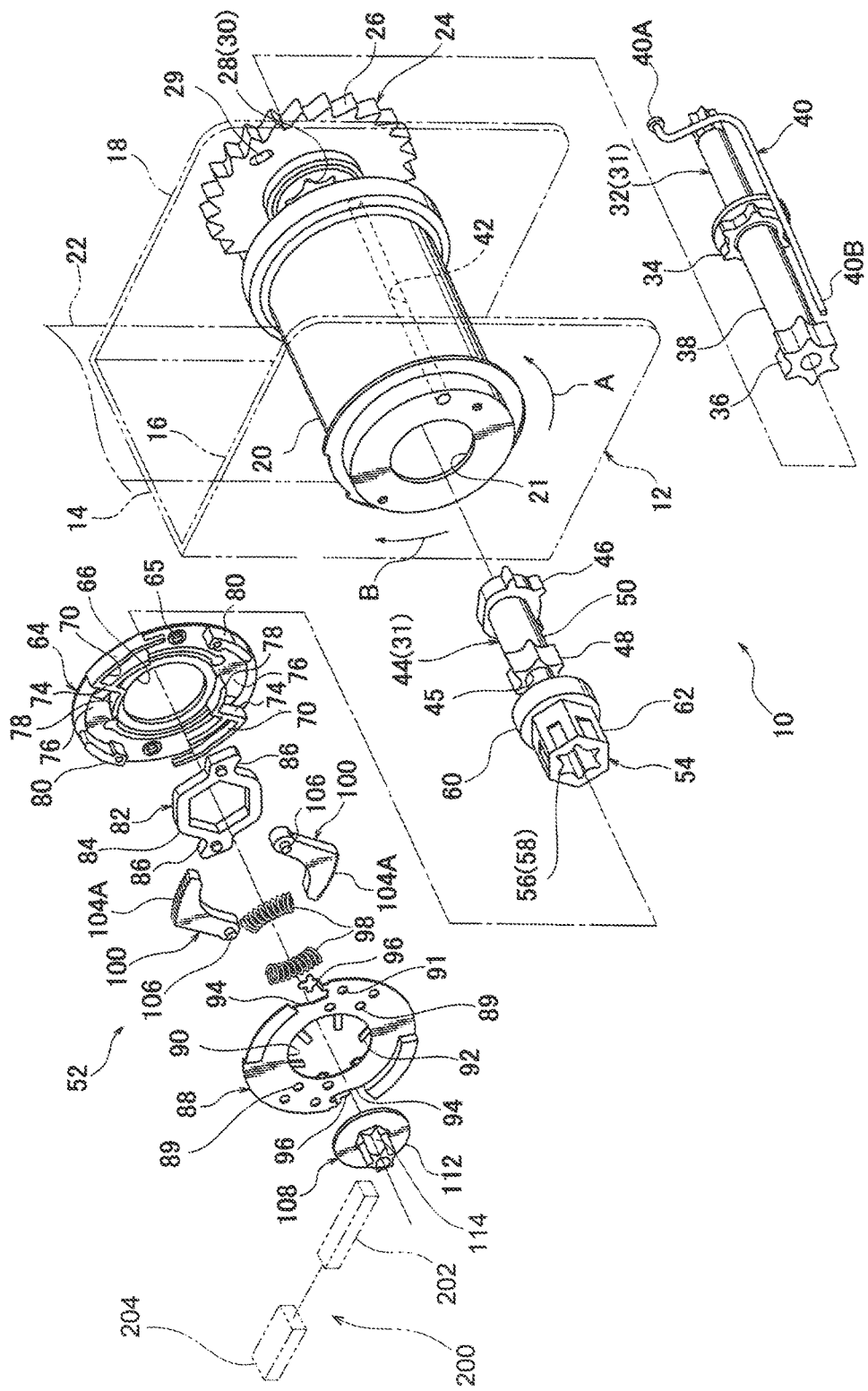
FIG. 1 is an exploded perspective view illustrating a configuration of relevant portions of a webbing take-up device according to a first exemplary embodiment.
Figure 2:
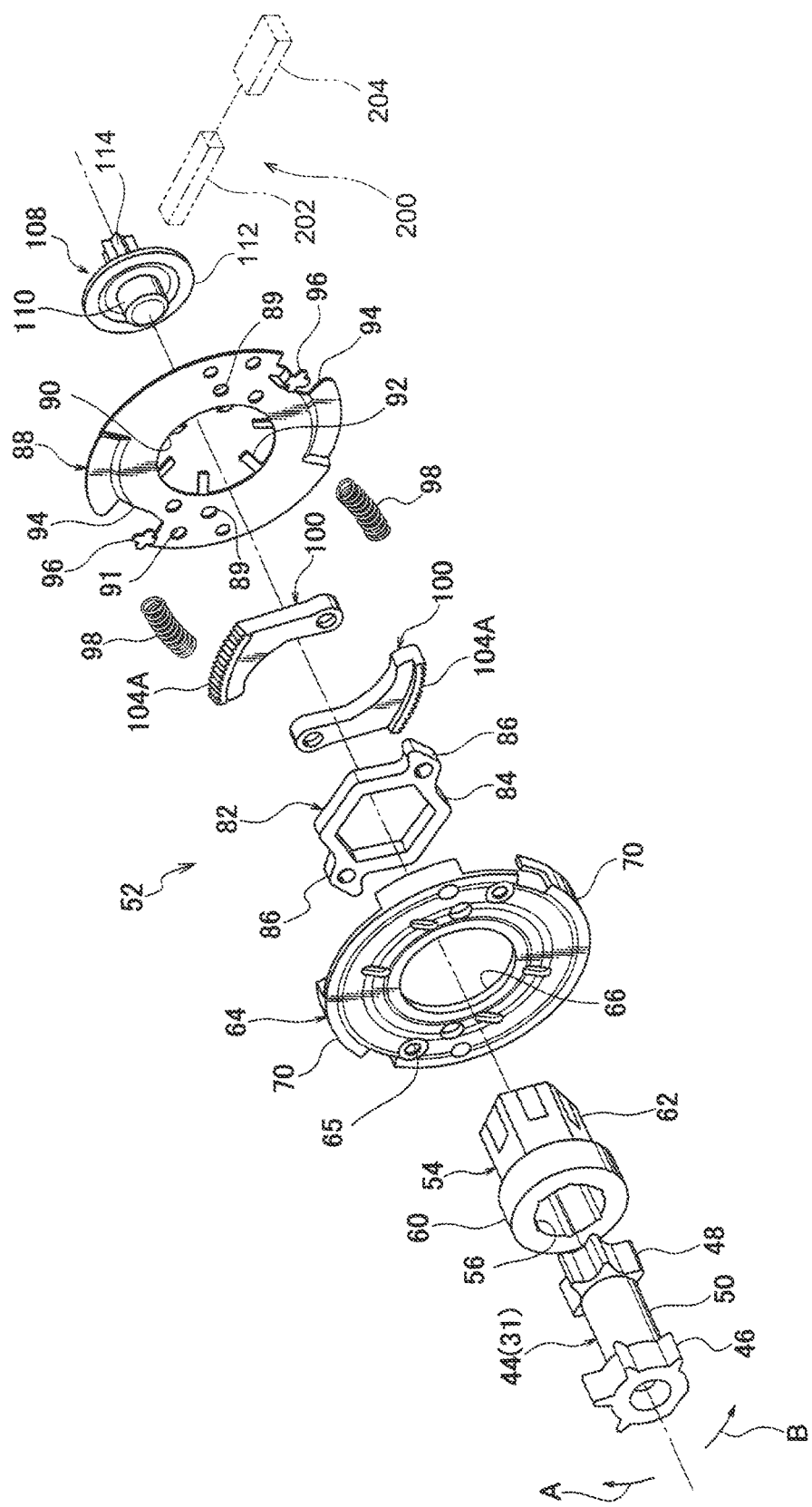
FIG. 2 is an exploded perspective view illustrating a configuration of a clutch mechanism of the webbing take-up device illustrated in FIG. 1.
Figure 5:
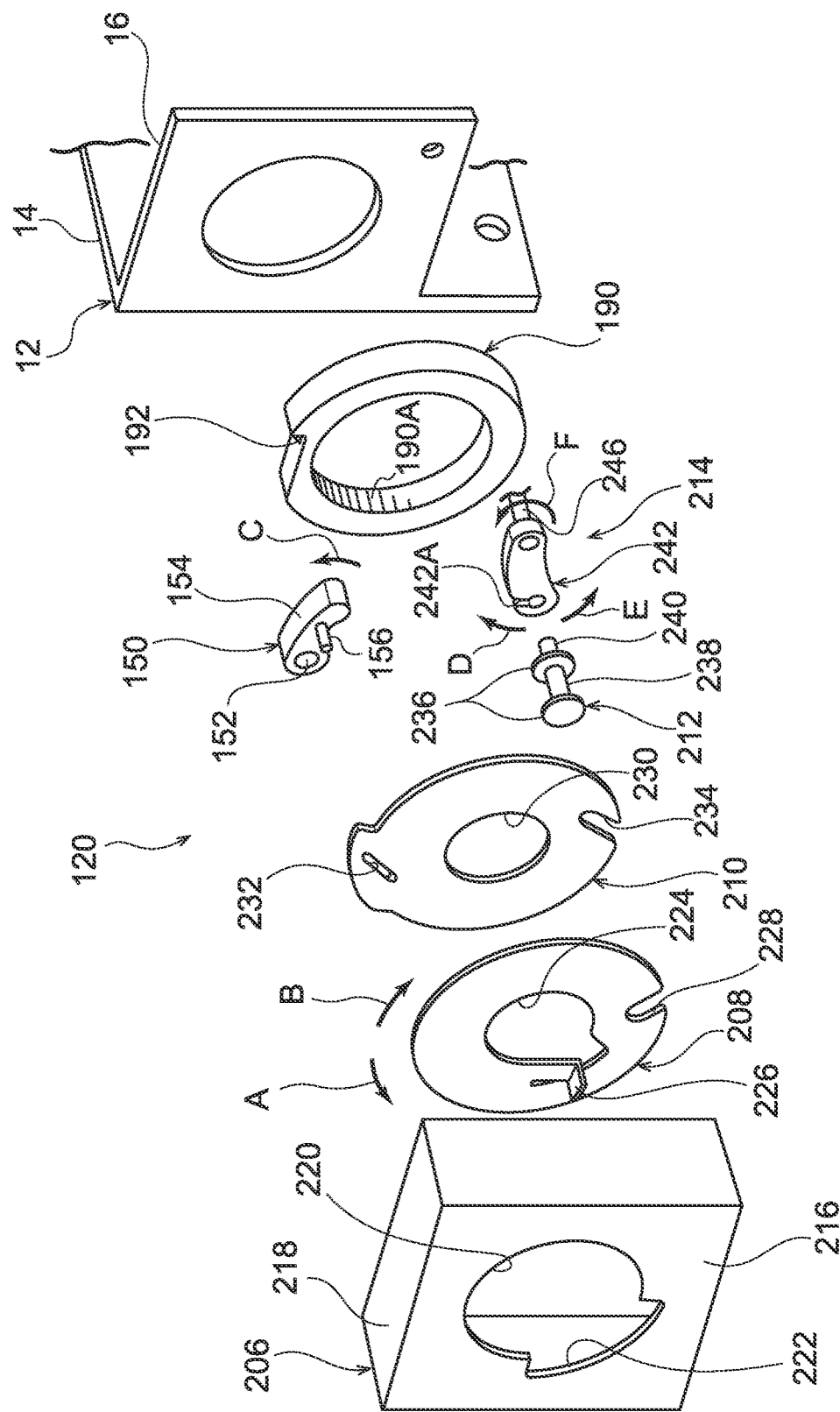
FIG. 5 is an exploded perspective view illustrating a configuration of a force limiter load switching mechanism of the webbing take-up device illustrated in FIG. 1.

As illustrated in FIG. 1 and FIG. 2, a webbing take-up device 10 according to an exemplary embodiment of the present invention includes a frame 12, a spool 20, a webbing 22, a lock gear 24 configuring part of a lock mechanism, a main torsion shaft 32 configuring a force limiter mechanism 31, a trigger wire 40, a sub torsion shaft 44, and a clutch mechanism 52. Moreover, the webbing take-up device 10 includes a pre-tensioner mechanism 200 that rotates the spool 20 in a take-up direction in a vehicle emergency so as to take up the webbing 22 onto the spool 20. As illustrated in FIG. 5, the webbing take-up device 10 further includes a force limiter load switching mechanism 120. First, explanation follows regarding the frame 12, followed by explanation regarding the spool 20, the webbing 22, the lock gear 24, the main torsion shaft 32, the trigger wire 40, the sub torsion shaft 44, the clutch mechanism 52, the force limiter mechanism 31, and the force limiter load switching mechanism 120 in turn. Note that an axial direction, a radial direction, and a circumferential direction respectively refer to the axial direction, radial direction, and circumferential direction of the spool 20 unless specifically stated otherwise.

As illustrated in FIG. 1, the frame 12 includes a plate shaped back plate 14 that is formed with a substantially concave shape in plan view and that is fixed to a vehicle body. Leg plates 16, 18 extend out substantially perpendicularly from both width direction end portions of the back plate 14. Note that a lock section (not illustrated in the drawings) is provided to an outside of the leg plate 18. The lock section configures part of the lock mechanism and engages with the lock gear 24.

The spool 20 is formed in a circular cylinder shape formed with a through hole 21 penetrating the spool 20 in the axial direction, and the spool 20 is disposed between the leg plate 16 and the leg plate 18 of the frame 12. The spool 20 is disposed in a state in which the axial direction of the spool 20 runs in a direction in which the leg plate 16 and the leg plate 18 face each other, and the spool 20 is rotatably supported by the frame 12 through the main torsion shaft 32, the sub torsion shaft 44, and the like, described later.

The webbing 22 is worn over the body of an occupant. A base end portion of the webbing 22, this being one length direction end portion of the webbing 22, is anchored to the spool 20. The spool 20 is configured to take up and store the webbing 22 from the base end side when the spool 20 rotates in a take-up direction (the arrow A direction in FIG. 1, etc.), this being one rotation direction.

The lock gear 24 is disposed on one axial direction side of the spool 20 so as to be coaxial to the spool 20. An outer peripheral portion of the lock gear 24 is formed with gear portions 26. An axial center portion of the lock gear 24 is formed with a through hole 28 penetrating the lock gear 24 in the axial direction, and an inner peripheral portion of the through hole 28 is formed with a spline shaped engaged portion 30.

The lock gear 24 engages with a locking section, not illustrated in the drawings, when the vehicle decelerates sharply, or when the spool 20 rotates sharply in a pull-out direction. As a result, rotation of the lock gear 24 in the pull-out direction (arrow B direction in FIG. 2 etc.) is restricted (locked), thereby restricting rotation of the spool 20 in the pull-out direction.

The main torsion shaft 32 is disposed coaxially to the spool 20 and the lock gear 24, and is inserted through each of the through hole 21 of the spool 20 and the through hole 28 of the lock gear 24. The main torsion shaft 32 is formed with a spline shaped first engaging portion 34 at a length direction central portion, and is similarly formed with a spline shaped second engaging portion 36 at a leading end portion. The first engaging portion 34 engages with the engaged portion 30 of the lock gear 24, thus fixing the main torsion shaft 32 to the lock gear 24 so as to be capable of rotating as a unit together with the lock gear 24. The second engaging portion 36 engages with an engaged portion, not illustrated in the drawings, formed at an axial direction intermediate portion of an inner peripheral portion of the spool 20, thus fixing the main torsion shaft 32 so as to be capable of rotating as a unit together with the spool 20. A portion of the main torsion shaft 32 between the first engaging portion 34 and the second engaging portion 36 configures a first energy absorption section 38 that absorbs kinetic energy of the occupant which may be used to pull the webbing 22, as described later.

A base end portion 40A of the trigger wire 40 is inserted into a hole 29 formed in the lock gear 24 at a position further to a radial direction outer side than the through hole 28, thereby anchoring the trigger wire 40 to the lock gear 24. Further to a leading end side of the trigger wire 40 from the base end portion 40A, the trigger wire 40 is inserted into a hole 42 formed alongside the through hole 21 in the spool 20. A leading end portion 40B of the trigger wire 40 projects out from the spool 20 toward another side in the axial direction.

The sub torsion shaft 44 is disposed coaxially to the main torsion shaft 32, and the sub torsion shaft 44 is inserted into the through hole 21 in the spool 20 at a base end side from a length direction central portion of the sub torsion shaft 44. The sub torsion shaft 44 projects out from the spool 20 toward the other axial direction side at a leading end side from the length direction central portion of the sub torsion shaft 44. A spline shaped first engaging portion 46 is formed at at least a portion of a base end portion of the sub torsion shaft 44, and a spline shaped second engaging portion 48 is similarly formed at a leading end portion of the sub torsion shaft 44. The first engaging portion 46 engages with an engaged portion, not illustrated in the drawings, formed at the axial direction intermediate portion of the inner peripheral portion of the spool 20, thereby fixing the sub torsion shaft 44 so as to be capable of rotating as a unit together with the spool 20. A portion of the sub torsion shaft 44 between the first engaging portion 46 and the second engaging portion 48 configures a second energy absorption section 50 that absorbs kinetic energy of the occupant which may be used to pull the webbing 22, as described later.

Figure 4A:
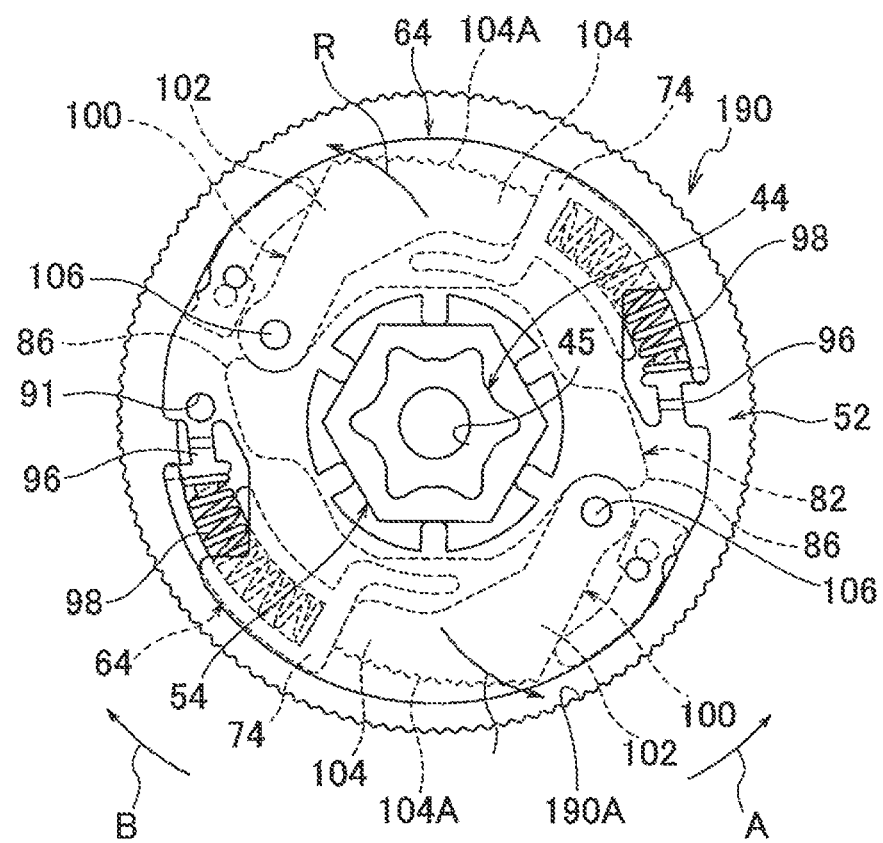
FIG. 4A is a view illustrating a state in which a clutch plate of the clutch mechanism illustrated in FIG. 3 has started to swing toward a lock ring side.
Figure 4B:
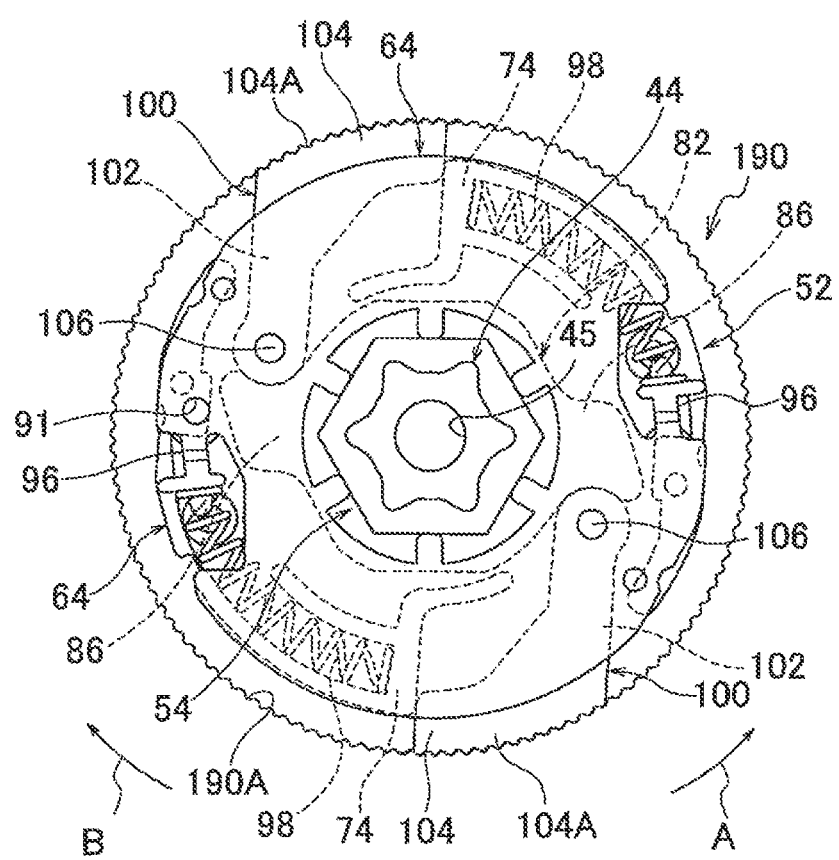
FIG. 4B is a view illustrating a state in which a clutch plate of the clutch mechanism illustrated in FIG. 3 has meshed with a lock ring.

As illustrated in FIG. 1 and FIG. 2, the clutch mechanism 52 includes a sleeve 54, a clutch guide 64, a clutch base 82, a clutch cover 88, a pair of clutch plates 100, a screw 108, and a pair of coil springs 98. Note that FIG. 4A illustrates a mid-actuation state of the clutch mechanism 52, and FIG. 4B illustrates a state in which actuation of the clutch mechanism 52 has completed.

The sleeve 54 is disposed coaxially to the sub torsion shaft 44. An axial center portion of the sleeve 54 is formed with a through hole 56 penetrating the sleeve 54 in an axial direction. The sub torsion shaft 44 described above is inserted into the through hole 56 with play between the sub torsion shaft 44 and the through hole 56. Moreover, a spline shaped engaged portion 58 is formed at a leading end side of an inner peripheral portion of the sleeve 54. The second engaging portion 48 of the sub torsion shaft 44 engages with the engaged portion 58, thereby fixing the sleeve 54 so as to be capable of rotating as a unit together with the sub torsion shaft 44. A base end side of the sleeve 54 is configured by a support portion 60 with a circular outer profile, and at a leading end side of the support portion 60, the sleeve 54 is configured by a fitting portion 62 with a hexagonal outer profile.

Figure 3:
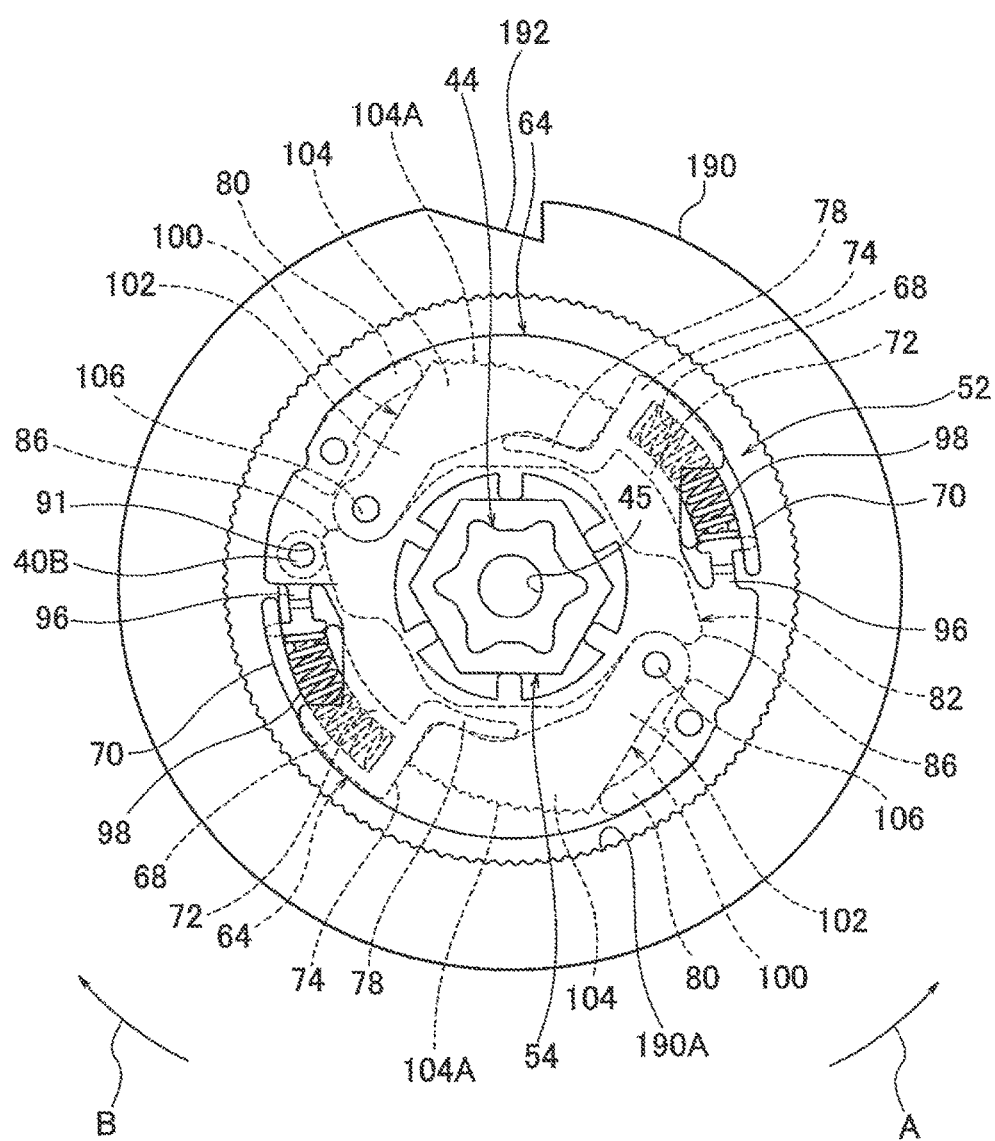
FIG. 3 is a view of a clutch mechanism of the webbing take-up device illustrated in FIG. 1, as viewed from the opposite side to a spool.

The clutch guide 64 is made of a resin, and is formed in a ring shape with a through hole 66 penetrating in an axial direction. The support portion 60 mentioned above is inserted into the through hole 66, thereby supporting the clutch guide 64 so as to be capable of rotating relative to the sleeve 54. As illustrated in FIG. 3, a pair of coil spring housing portions 68 that house the coil springs 98 are formed at two positions in a circumferential direction of the clutch guide 64. The coil spring housing portions 68 are formed with point symmetry to one another about the center of the clutch guide 64, and are each formed in a substantially U-shape and include an outer side wall 70 and an inner side wall 72 respectively extending along the circumferential direction of the clutch guide 64, and a coupling wall 74 extending in a radial direction of the clutch guide 64 and coupling together respective end portions of the outer side wall 70 and the inner side wall 72. In the clutch guide 64, a pair of clutch plate housing portions 76 housing the clutch plates 100 is formed adjacent to the respective coil spring housing portions 68. Each clutch plate housing portion 76 is formed with a first support wall 78 extending from the coupling wall 74 toward the opposite side to the inner side wall 72, and a second support wall 80 on the opposite side of the coupling wall 74 to the outer side wall 70 and separated from the coupling wall 74.

As illustrated in FIG. 1 and FIG. 2, the clutch base 82 is configured including a hexagonal ring shaped fitted portion 84. The fitting portion 62 of the sleeve 54 is fitted (press-fitted) inside the fitted portion 84, thereby fixing the clutch base 82 so as to be capable of rotating as a unit together with the sleeve 54. Note that in an alternative exemplary embodiment, the sleeve 54 and the clutch base 82 may be formed integrally to each other. The clutch base 82 is further formed with a pair of anchor portions 86 projecting out from the fitted portion 84 toward an outer side. The anchor portions 86 are respectively anchored to base end portions of arms 102 formed at the clutch plates 100, described later.

The clutch cover 88 is disposed coaxially to the sleeve 54, and is disposed at the opposite side of the clutch guide 64 to the spool 20 so as to be disposed facing the clutch guide 64. The clutch cover 88 is formed in a ring shape having a through hole 90 penetrating in an axial direction, and plural fitting claws 92 are formed projecting out toward a radial direction inner side at an inner peripheral portion of the clutch cover 88. The fitting portion 62 of the sleeve 54 is inserted into the through hole 90, and the plural fitting claws 92 fit together with the fitting portion 62, thereby fixing the clutch cover 88 so as to be capable of rotating as a unit together with the sleeve 54, and thus with the sub torsion shaft 44. Cross-shaped claws 96, described later, of the clutch cover 88 engage with the clutch guide 64 in a circumferential direction. The clutch guide 64 is capable of rotating relative to the clutch cover 88 between an actuated position illustrated in FIG. 4B, and a non-actuated position illustrated in FIG. 3. Moreover, respective notches 94 having recessed profiles opening toward the radial direction outer side as viewed along the axial direction are formed at two positions in the circumferential direction of the clutch cover 88. The clutch cover 88 includes a pair of the cross-shaped claws 96 formed so as to be positioned inside the respective notches 94. The pair of cross-shaped claws 96 is formed with point symmetry about the center of the clutch cover 88. Moreover, the cross-shaped claws 96 are bent into crank shapes as viewed along a radial direction of the clutch cover 88, such that leading end sides of the cross-shaped claws 96 project out further to a clutch guide 64 side than base end sides of the cross-shaped claws 96.

The leading end side of each cross-shaped claw 96 is provided with an inward projection projecting out toward the radial direction inner side of the clutch guide 64, an outward projection projecting out toward the radial direction outer side of the clutch guide 64, and a circumferential direction projection projecting out one way in the circumferential direction of the clutch guide 64 (in the take-up direction). The leading end side of each cross-shaped claw 96 is formed in a cross-shape as viewed along the axial direction of the clutch guide 64.

The clutch plates 100 are disposed between the clutch cover 88 and the clutch guide 64. Each of the clutch plates 100 includes the arm 102, and a circular arc portion 104 formed at a leading end portion of the arm 102. A base end portion of the arm 102 is formed with a swing shaft 106 that projects out toward a clutch cover 88 side and extends along the axial direction of the sub torsion shaft 44. The swing shaft 106 is inserted into a hole 89 (see FIG. 1) formed in the clutch cover 88 such that the respective clutch plate 100 is supported by the clutch cover 88 so as to be capable of swinging. Moreover, an outer peripheral portion of the circular arc portion 104 (leading end portion of the clutch plate 100) is formed with knurled teeth 104A to give a spur gear profile.

As illustrated in FIG. 1 and FIG. 2, the screw 108 is configured including a threaded portion 110, a retaining portion 112 that has a larger diameter than the threaded portion 110, and a pinion gear 114 that configures part of the pre-tensioner mechanism 200, described later. The threaded portion 110 is screwed into a threaded hole 45 formed in a leading end portion of the sub torsion shaft 44, thereby fixing the screw 108 to the leading end portion of the sub torsion shaft 44. In this manner, the retaining portion 112 is abutted against a leading end portion of the sleeve 54 in a state in which the screw 108 is fixed to the leading end portion of the sub torsion shaft 44. This thereby limits movement of the sleeve 54 in a direction that would cause the sleeve 54 to come out from the sub torsion shaft 44. Note that in this state, the clutch cover 88 and the spool 20 limit axial direction movement of the clutch guide 64.

Moreover, the clutch guide 64 and the clutch cover 88 described above are respectively formed with holes 65, 91. The holes 65, 91 are formed so as to oppose each other in a state in which the clutch guide 64 is disposed at the non-actuated position with respect to the clutch cover 88. The leading end portion 40B of the trigger wire 40 is inserted through the respective holes 65, 91. This thereby limits rotation of the clutch guide 64 relative to the spool 20 and the clutch cover 88 in a state in which the clutch guide 64 is disposed at the non-actuated position (the clutch guide 64 is restrained at the non-actuated position).

Moreover, in a state in which the clutch guide 64 is restrained in the non-actuated position as described above, the respective cross-shaped claws 96 of the clutch cover 88 are positioned in the vicinity of openings of the respective coil spring housing portions 68 of the clutch guide 64, as illustrated in FIG. 3. The circumferential direction projections of the respective cross-shaped claws 96 are inserted inside the coil springs 98 housed in the respective coil spring housing portions 68 from one axial direction end portion of each coil spring 98, such that the inward projection and the outward projection of each cross-shaped claw 96 abut the one axial direction end portion of the corresponding coil spring 98. The one axial direction end portions of the coil springs 98 are thereby anchored to the respective cross-shaped claws 96. Another axial direction end portion of each coil spring 98 is anchored to the coupling wall 74 of the corresponding coil spring housing portion 68.

In this state, a spacing between each cross-shaped claw 96 and the coupling wall 74 is shorter than the overall length of the coil spring 98 when in a free state, thus placing the coil springs 98 in a compressed state. An urging force in the take-up direction is thereby applied to the clutch guide 64 so as to urge the clutch guide 64 toward the actuated position.

Moreover, this state is a state in which a sufficient spacing is secured between the holes 89 in the clutch cover 88 (swing shafts 106 of the clutch plates 100) and the coupling walls 74, and the clutch plates 100 are housed in the clutch plate housing portions 76 such that the knurled teeth 104A are contained at the inside of an outer peripheral portion of the clutch guide 64. In this state, the coupling walls 74 abut leading ends of the circular arc portions 104.

As illustrated in FIG. 1 and FIG. 2, the pre-tensioner mechanism 200 is configured including the pinion gear 114 provided to the screw 108, a rack 202 disposed at a separation from the pinion gear 114, and an actuator 204 that is actuated in order to move the rack 202 toward a pinion gear 114 side. When the actuator 204 actuates as a result of a vehicle collision having been detected, the rack 202 moves toward a pinion gear 114 side under the pressure of high pressure gas. Moreover, when the rack 202 moves, the rack 202 meshes with the pinion gear 114 and rotates the pinion gear 114. The screw 108 is thereby rotated in the take-up direction together with the sub torsion shaft 44 and the spool 20, such that a predetermined length of the webbing 22 is taken up onto the spool 20.

Next, explanation follows regarding the force limiter load switching mechanism 120.

As illustrated in FIG. 5, the force limiter load switching mechanism 120 is provided between a housing 206 attached to the frame 12 and the leg plate 16 of the frame 12. The force limiter load switching mechanism 120 includes a first link plate 208, serving as a first rotating body, that is rotated when input with a portion of an actuation force that actuates the pre-tensioner mechanism 200 (see FIG. 1), a second link plate 210, serving as a second rotating body, that is rotated by rotational force transmitted from the first link plate 208, and a coupling pin 212, serving as a coupling member, that couples the first link plate 208 with the second link plate 210. The force limiter load switching mechanism 120 further includes a pawl 150, serving as a rotation restriction member, that is displaced by rotation of the second link plate 210, and a lock ring 190, serving as a switching rotating body, that is restricted from rotating or that has this restriction released by the pawl 150. The force limiter load switching mechanism 120 further includes an engagement switching mechanism 214 that switches between a state in which the coupling pin 212 is engaged with the first link plate 208 and the second link plate 210, and a state in which the coupling pin 212 is not engaged with the first link plate 208 and the second link plate 210.

The housing 206 is formed in a box shape opening toward the frame 12 side. The housing 206 includes a base wall 216 extending parallel to the leg plate 16 of the frame 12, and side walls 218 extending from end portions of the base wall 216 toward the frame 12 side. The base wall 216 is formed with a circular opening 220. Part of an inner edge of the circular opening 220 is configured with a notch 222, configured as a substantially fan-shaped notch as viewed along the axial direction. Forming the notch 222 enables an input portion 226 provided to the first link plate 208, described later, to project out to the exterior of the housing 206.

The first link plate 208 is formed in a circular plate shape with a thickness direction in the axial direction. A circular opening 224 is formed in an axial center portion of the first link plate 208. A support portion, not illustrated in the drawings, is inserted through the opening 224 so as to rotatably support the first link plate 208. Part of an inner edge of the opening 224 in the first link plate 208 is bent toward a housing 206 side. This bent location configures the input portion 226 that is pushed by a portion of the rack 202 (see FIG. 1) that has moved as a result of the actuator 204 being actuated. When the input portion 226 is pushed by the portion of the rack 202, the first link plate 208 is swung toward one circumferential direction side (arrow A direction side). An outer peripheral portion of the first link plate 208 is formed with a first engagement groove 228, serving as a first rotating body side engagement groove, that is open at a radial direction outer side and closed at a radial direction inner side, and that is inclined toward another circumferential direction side (arrow B direction side) on progression toward the radial direction inside.

Figure 7:
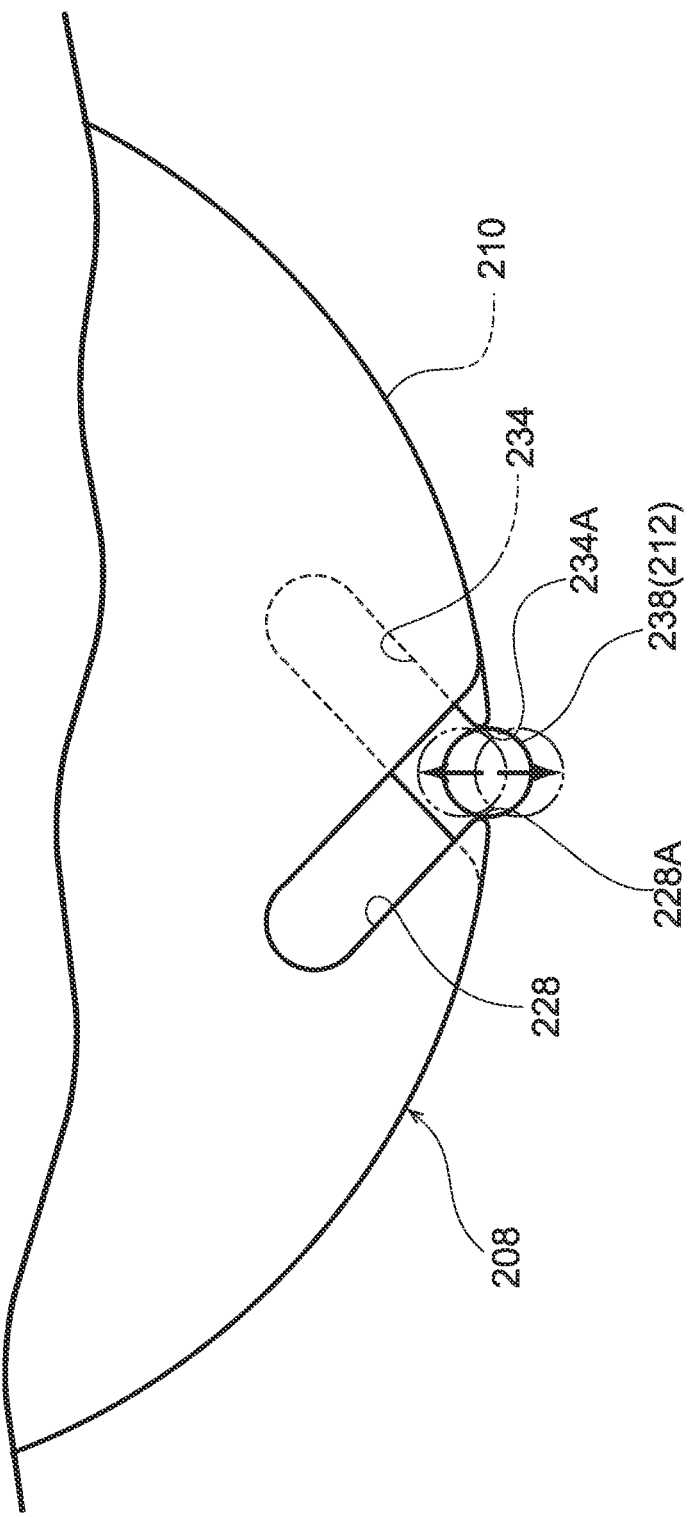
FIG. 7 is an enlarged face-on view illustrating a first engagement groove formed in a first link plate and a second engagement groove formed in a second link plate, as viewed along an axial direction of a spool.

The second link plate 210 is disposed on a frame 12 side of the first link plate 208, and formed in a circular plate shape with a thickness direction in the axial direction. A circular opening 230 is formed at an axial center portion of the first link plate 208. A support portion, not illustrated in the drawings, is inserted through the opening 230 so as to rotatably support the second link plate 210. An outer peripheral portion of the second link plate 210 is formed with an insertion hole 232 formed in an elongated hole shape, and through which an insertion pin 156 of the pawl 150, described later, is inserted. As viewed along the axial direction, the insertion hole 232 is inclined toward a radial direction outer side on progression toward another circumferential direction side (arrow B direction side). The outer peripheral portion of the second link plate 210 is also formed with a second engagement groove 234, serving as a second rotating body side engagement groove, that is open at a radial direction outer side and closed at a radial direction inner side, and that is inclined toward the one circumferential direction side (arrow A direction side) on progression toward the radial direction inner side. Moreover, in a state prior to the first link plate 208 rotating accompanying actuation of the pre-tensioner mechanism 200, as illustrated in FIG. 7, a radial direction outer side location of the first engagement groove 228 formed in the first link plate 208 and a radial direction outer side location of the second engagement groove 234 formed in the second link plate 210 are both disposed at the same position in the circumferential direction. The coupling pin 212 is thus capable of engaging with both the first engagement groove 228 and the second engagement groove 234.

As illustrated in FIG. 5, the coupling pin 212 is configured including a pair of circular plate portions 236 each formed in a circular plate shape and disposed separated from one another in the axial direction, an engaging portion 238 that is formed in a circular column shape connecting the pair of circular plate portions 236 together in the axial direction and that engages with the first engagement groove 228 and the second engagement groove 234 described above, and an anchor portion 240 that projects out toward the frame 12 side from an axial center portion of the circular plate portion 236 disposed on the frame 12 side, and that is anchored to a coupling pin moving tab 242, described later. Moving the coupling pin 212 toward the radial direction inner side and engaging the engaging portion 238 of the coupling pin 212 with the first engagement groove 228 and the second engagement groove 234 couples the first link plate 208 with the second link plate 210 through the coupling pin 212, such that the first link plate 208 and the second link plate 210 rotate together as a unit. Moreover, moving the coupling pin 212 toward the radial direction outer side and removing the engaging portion 238 of the coupling pin 212 from the first engagement groove 228 and the second engagement groove 234 achieves a state in which the first link plate 208 and the second link plate 210 are not coupled together through the coupling pin 212. Namely, rotational force of the first link plate 208 is not input to the second link plate 210.

The pawl 150 is formed in a rectangular block shape and is provided between the second link plate 210 and the lock ring 190. One end portion of the pawl 150 is formed with a support hole 152 through which a shaft, not illustrated in the drawings, is inserted such that the pawl 150 is tiltably supported on the shaft. Moreover, another end side of the pawl 150 is configured by an engaging portion 154 that engages with a notch 192 of the lock ring 190, described later. Rotation of the lock ring 190 is restricted by engagement of the engaging portion 154 of the pawl 150 with the notch 192 of the lock ring 190. The pawl 150 further includes the insertion pin 156 that projects out from an end face on a second link plate 210 side of the engaging portion 154 toward the second link plate 210 side, and that is inserted into the insertion hole 232 formed in the second link plate 210. The pawl 150 is tilted toward the arrow C direction by the second link plate 210 being rotated toward one circumferential direction side (arrow A direction side), and by the insertion pin 156 of the pawl 150 being pushed by an inner edge of the insertion hole 232. The engaging portion 154 of the pawl 150 thereby adopts a state that is not engaged with the notch 192 of the lock ring 190, thereby permitting rotation of the lock ring 190.

The lock ring 190 is formed in a substantially circular ring shape, and an outer peripheral portion of the lock ring 190 is formed with the notch 192 with which the engaging portion 154 of the pawl 150 engages. Moreover, an inner peripheral portion of the lock ring 190 is formed with knurled teeth 190A to give a spur gear profile. As described later, the knurled teeth 190A of the lock ring 190 are capable of meshing together with the knurled teeth 104A of the clutch plates 100 of the clutch mechanism.

Figure 6:
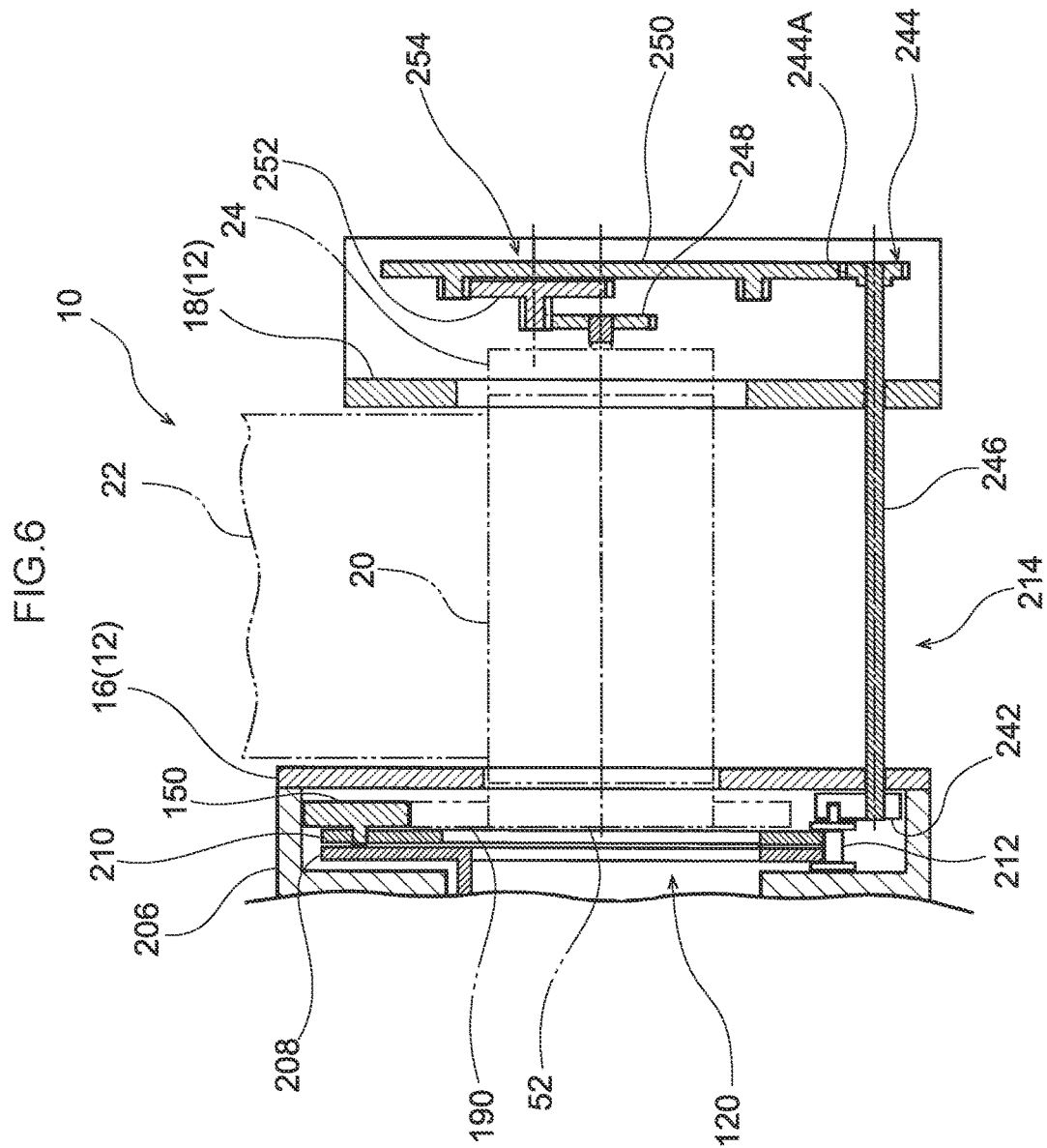
FIG. 6 is a cross-section illustrating a webbing take-up device sectioned along an axial direction of a spool.

As illustrated in FIG. 6, the engagement switching mechanism 214 includes the coupling pin moving tab 242 that moves the coupling pin 212, a swinging tab 244 provided on the opposite side at the leg plate 18 of the frame 12 to the spool 20, and a coupling shaft 246 that couples the coupling pin moving tab 242 and the swinging tab 244 together. The engagement switching mechanism 214 further includes a speed reduction mechanism 254 including a primary gear 248 provided capable of rotating as a unit together with the lock gear 24, a final gear 250 disposed coaxially to the primary gear 248, and a counter gear 252 provided between the primary gear 248 and the final gear 250. The speed reduction mechanism 254 transmits rotation of the primary gear 248 to the final gear 250 while reducing the rotation speed by a predetermined reduction ratio.

As illustrated in FIG. 5 and FIG. 6, the coupling pin moving tab 242 is formed in a rectangular block shape, and one end portion of the coupling pin moving tab 242 is fixed to one end portion of the coupling shaft 246. Moreover, as illustrated in FIG. 5, another end portion of the coupling pin moving tab 242 is formed with an anchor recess 242A that is open toward an axial center side of the spool 20 and to which the anchor portion 240 of the coupling pin 212 is anchored. When the coupling pin moving tab 242 is tilted toward an arrow D direction in an anchored state of the anchor portion 240 of the coupling pin 212 to a depth direction end portion of the anchor recess 242A, the engaging portion 238 of the coupling pin 212 engages with the first engagement groove 228 formed in the first link plate 208 and the second engagement groove 234 formed in the second link plate 210. Moreover, when the coupling pin moving tab 242 is tilted toward an arrow E direction in the anchored state of the anchor portion 240 of the coupling pin 212 to the depth direction end portion of the anchor recess 242A, the engaging portion 238 of the coupling pin 212 comes out of the first engagement groove 228 formed in the first link plate 208 and the second engagement groove 234 formed in the second link plate 210. Moreover, an open end side of the anchor recess 242A is set with a narrower width than the diameter of the anchor portion 240 of the coupling pin 212. Moreover, when the first link plate 208 and the second link plate 210 swing in a state in which the engaging portion 238 of the coupling pin 212 is engaged with the first engagement groove 228 of the first link plate 208 and the second engagement groove 234 of the second link plate 210, the anchor portion 240 of the coupling pin 212 pushes apart an open end side of the anchor recess 242A such that the coupling pin 212 becomes capable of moving toward the one circumferential direction side (arrow A direction side).

As illustrated in FIG. 6, the swinging tab 244 is formed in a rectangular block shape, and one end portion of the swinging tab 244 is fixed to another end portion of the coupling shaft 246. Moreover, another end portion of the swinging tab 244 is configured by an abutting portion 244A that abuts an outer peripheral portion of the final gear 250, described later. Note that the abutting portion 244A is urged toward an outer peripheral portion side of the final gear 250 by an urging member, not illustrated in the drawings.

An outer peripheral portion of the final gear 250 is provided with a small diameter portion, and a large diameter portion configured with a larger external diameter than the small diameter portion. When a predetermined length of the webbing 22 is pulled out from a state completely taken up onto the spool 20, the small diameter portion of the outer peripheral portion of the final gear 250 abuts the abutting portion 244A of the swinging tab 244. Moreover, in an abutting state of the small diameter portion of the outer peripheral portion of the final gear 250 and the abutting portion 244A of the swinging tab 244, the engaging portion 238 of the coupling pin 212 is engaged with the first engagement groove 228 formed in the first link plate 208 and the second engagement groove 234 formed in the second link plate 210. Moreover, when in excess of the predetermined length of the webbing 22 is pulled out from the spool 20, the abutting portion 244A of the swinging tab 244 rides up over and abuts the large diameter portion of the outer peripheral portion of the final gear 250. The swinging tab 244 accordingly tilts such that the coupling shaft 246 swings in an arrow F direction as illustrated in FIG. 5. The coupling pin moving tab 242 tilts in the arrow E direction as a result, such that the engaging portion 238 of the coupling pin 212 comes out of the first engagement groove 228 formed in the first link plate 208 and the second engagement groove 234 formed in the second link plate 210. Note that in the present exemplary embodiment, setting is made such that when the webbing 22 is being worn by an occupant of small build, the webbing 22 pulled out from the spool 20 does not exceed the predetermined length, and when the webbing 22 is being worn by an occupant of large build, the webbing 22 pulled out from the spool 20 does exceed the predetermined length. Note that an occupant of small build corresponds to an occupant having the same physique as an AF05 dummy, and an occupant of large build corresponds to an occupant having the same physique as an AM50 dummy.

Operation and Advantageous Effects of the Present Exemplary Embodiment

Next, explanation follows regarding operation and advantageous effects of the present exemplary embodiment.

As illustrated in FIG. 1 and FIG. 2, in the webbing take-up device 10 according to the present exemplary embodiment, the spool 20, the lock gear 24, the main torsion shaft 32, the sub torsion shaft 44, and the clutch mechanism 52 (including the sleeve 54, the clutch base 82, the clutch plates 100, and the screw 108) are configured to rotate together as a unit in the take-up direction and the pull-out direction. Accordingly, the webbing 22 is pulled out from the spool 20 in order to wear the webbing 22 over the body of the occupant of the vehicle.

Moreover, in a state in which the webbing 22 is being worn over the body of the occupant of the vehicle, when the lock mechanism to actuates as a result of a vehicle collision, rotation of the lock gear 24 in the pull-out direction is prevented. This thereby limits pull-out direction rotation of the spool 20 that is coupled to the lock gear 24 through the main torsion shaft 32, thus limiting pull-out of the webbing 22 from the spool 20. The body of the occupant attempting to move toward the vehicle front is thus restrained by the webbing 22.

Moreover, in a state in which the webbing 22 is being worn of the body of the occupant of the vehicle, for example, when the actuator 204 is actuated as a result of a vehicle collision, the rack 202 moves toward the pinion gear 114 side. Moreover, when the rack 202 moves, the rack 202 meshes together with the pinion gear 114 and rotates the pinion gear 114. The screw 108 is thereby rotated in the take-up direction together with the sub torsion shaft 44 and the spool 20, such that a specific length of the webbing 22 is taken up onto the spool 20. This thereby removes any slack in the webbing 22 worn by the occupant, and increases the restraint force on the occupant from the webbing 22.

In a state in which pull-out direction rotation of the lock gear 24 is prevented, should the body of the occupant pull on the webbing 22 with an even greater force, such that a rotational force in the pull-out direction acting on the spool 20 as a result of this pulling force exceeds a torsion-withstand load (deformation-withstand load) of the first energy absorption section 38 of the main torsion shaft 32, the force limiter mechanism 31 actuates, and torsion (deformation) of the first energy absorption section 38 permits rotation of the spool 20.

Accordingly, the load (burden) due to the webbing 22 acting on the chest of the occupant is lessened due to the spool 20 rotating in the pull-out direction and the webbing 22 being pulled out from the spool 20 as a result of the first energy absorption section 38 undergoing torsion. Moreover, kinetic energy of the occupant which may be used to pull the webbing 22 is absorbed in an amount commensurate with the torsion of the first energy absorption section 38.

On the other hand, as described above, rotation of the spool 20 in the pull-out direction with respect to the lock gear 24 as a result of the first energy absorption section 38 undergoing torsion means that the lock gear 24 rotates in the take-up direction relative to the spool 20. Accordingly, when the lock gear 24 rotates in the take-up direction relative to the spool 20, the base end portion 40A of the trigger wire 40 is moved in the circumferential direction of the main torsion shaft 32, while at the leading end side from the base end portion 40A, the trigger wire 40 remains inserted through the hole 42 in the spool 20. Accordingly, at the leading end side from the base end portion 40A, the trigger wire 40 is pulled toward the lock gear 24 side with respect to the hole 42.

The leading end portion 40B of the trigger wire 40 is thus pulled out of the hole 65 in the clutch guide 64 and the hole 91 in the clutch cover 88, thereby releasing a state in which rotation of the clutch guide 64 relative to the spool 20 and the clutch cover 88 is prevented.

The clutch guide 64 is then rotated from the non-actuated position to the actuated position by urging force of the coil springs 98. When this occurs, the spacing between the holes 89 in the clutch cover 88 (swing shafts 106 of the clutch plates 100) and the coupling walls 74 of the clutch guide 64 becomes shorter, and a leading end of the circular arc portion 104 of each clutch plate 100 is pressed (guided) in a direction tangential to the clutch guide 64 by the coupling wall 74. Each clutch plate 100 is thus swung toward the lock ring 190 side (see arrows R in FIG. 4A), and the knurled teeth 104A of the clutch plates 100 mesh together with the knurled teeth 190A of the lock ring 190 (the state illustrated in FIG. 4B). The clutch plates 100 and the lock ring 190 are thereby coupled together. Moreover, when this occurs, each anchor portion 86 formed at the clutch base 82 presses a base end portion of the arm 102 of the corresponding clutch plate 100 in the pull-out direction, such that the clutch plates 100 are pressed against the lock ring 190, and thus maintaining the coupled state between the two. Accordingly, the lock ring 190 attempts to rotate in the pull-out direction together with the pull-out direction rotation of the clutch mechanism 52 (the sleeve 54, the clutch base 82, and the clutch plates 100).

Note that in a state in which the abutting portion 244A of the swinging tab 244 illustrated in FIG. 6 has ridden over the large diameter portion of the outer peripheral portion of the final gear 250 due to the webbing 22 being worn by an occupant of large build, the engaging portion 238 of the coupling pin 212 illustrated in FIG. 5 comes out of the first engagement groove 228 formed in the first link plate 208 and the second engagement groove 234 formed in the second link plate 210. Accordingly, when the pre-tensioner mechanism 200 is actuated, even when the input portion 226 of the first link plate 208 is pushed by a portion of the rack 202 (see FIG. 1), such that the first link plate 208 is swung toward the one circumferential direction side (arrow A direction side), the rotational force of the first link plate 208 is not input to the second link plate 210. Accordingly, the pawl 150 does not tilt away from the state of engagement with the notch 192 of the lock ring 190, such that pull-out direction rotation of the lock ring 190 is locked (prevented). Rotation of the clutch mechanism 52 (the sleeve 54, the clutch base 82, and the clutch plates 100) in the pull-out direction is thereby prevented as a result.

Then, in the state in which pull-out direction rotation of the sleeve 54 configuring a portion of the clutch mechanism 52 is prevented, when the body of the occupant pulls on the webbing 22 with an even greater force, such that a rotational force in the pull-out direction acting on the spool 20 as a result of this pulling force exceeds the sum of the torsion-withstand load (deformation-withstand load) of the first energy absorption section 38 of the main torsion shaft 32 and a torsion-withstand load (deformation-withstand load) of the second energy absorption section 50 of the sub torsion shaft 44, the first energy absorption section 38 and the second energy absorption section 50 twist (deform) so as to permit pull-out direction rotation of the spool 20. Namely, the force limiter load value becomes the sum of the torsion-withstand load of the first energy absorption section 38 and the torsion-withstand load of the second energy absorption section 50, and pull-out direction rotation of the spool 20 is permitted when the rotational force acting on the spool 20 as a result of this pulling force exceeds this force limiter load value.

Accordingly, a load (burden) due to the webbing 22 acting on the chest of the occupant is lessened due to the spool 20 rotating in the pull-out direction and the webbing 22 being pulled out from the spool 20 as a result of the first energy absorption section 38 and the second energy absorption section 50 undergoing torsion. Moreover, kinetic energy of the occupant which may be used to pull the webbing 22 is absorbed in an amount commensurate with the torsion of the first energy absorption section 38 and the second energy absorption section 50.

On the other hand, in a state in which the abutting portion 244A of the swinging tab 244 illustrated in FIG. 6 abuts the small diameter portion of the outer peripheral portion of the final gear 250 due to the webbing 22 being worn by an occupant of small build, the engaging portion 238 of the coupling pin 212 illustrated in FIG. 5 is engaged with the first engagement groove 228 formed in the first link plate 208 and the second engagement groove 234 formed in the second link plate 210. Accordingly, when the pre-tensioner mechanism 200 is actuated, the input portion 226 of the first link plate 208 is pushed by a portion of the rack 202 (see FIG. 1) such that the first link plate 208 is swung toward the one circumferential direction side (arrow A direction side), and the second link plate 210 accordingly rotates together with the first link plate 208. When this occurs, the insertion pin 156 of the pawl 150 is pressed by the inner edge of the insertion hole 232 of the second link plate 210 such that the pawl 150 is tilted in the arrow C direction. Accordingly, the engaging portion 154 of the pawl 150 adopts a state that is not engaged with the notch 192 of the lock ring 190, thereby permitting rotation of the lock ring 190.

Permitting rotation of the lock ring 190 in the pull-out direction enables the lock ring 190 to rotate in the pull-out direction together with the clutch mechanism 52 (the sleeve 54, the clutch base 82, and the clutch plates 100) and the spool 20. Accordingly, since twisting of the second energy absorption section 50 does not occur, rotation of the spool 20 is permitted due to twisting (deformation) of the first energy absorption section 38. Namely, the force limiter load value is the torsion-withstand load of the first energy absorption section 38, and rotation of the spool in the pull-out direction is permitted when the rotational force of the spool 20 arising due to pulling force from the body of the occupant exceeds this force limiter load value.

As described above, in the present exemplary embodiment, a state in which pull-out direction rotation of the clutch mechanism 52 (the sleeve 54, the clutch base 82, and the clutch plates 100) is prevented by the force limiter load switching mechanism 120 is maintained in cases in which the webbing 22 is being worn by an occupant with a large build, and so the force limiter load value is set to a load value of the sum of the torsion-withstand load of the first energy absorption section 38 and the torsion-withstand load of the second energy absorption section 50. Namely, the force limiter load value is set to a high load value. On the other hand, pull-out direction rotation of the clutch mechanism 52 (the sleeve 54, the clutch base 82, and the clutch plates 100) is enabled by the force limiter load switching mechanism 120 in cases in which the pre-tensioner mechanism 200 (actuator 204) is actuated when the webbing 22 is being worn by an occupant of small build, and so the force limiter load value is set to the torsion-withstand load of the first energy absorption section 38. Namely, the force limiter load value is set to a low load value. This thereby enables appropriate occupant protection according to the build of the occupant.

Note that in the present exemplary embodiment, a portion of the actuation force of the actuator 204 that actuates of the pre-tensioner mechanism 200 is input into the first link plate 208 configuring part of the force limiter load switching mechanism 120 in order to switch the force limiter load value. In other words, the force limiter load switching mechanism 120 can be actuated without providing an actuator solely for the purpose of actuating the force limiter load switching mechanism 120. This thereby enables an increase in the complexity of the structure to be suppressed in comparison to a webbing take-up device provided with an actuator solely for the purpose of actuating the force limiter load switching mechanism 120 in addition to the actuator 204 provided solely for the purpose of actuating the pre-tensioner mechanism 200.

Moreover, in the present exemplary embodiment, the force limiter load value can be switched from a high load value to a low load value by actuating the pre-tensioner mechanism 200. In other words, configuration is made such that force limiter load value is maintained at the high load value in cases in which the pre-tensioner mechanism 200 does not actuate. Accordingly, for example, the force limiter load value can be prevented from switching to a low load in cases in which actuation of the pre-tensioner mechanism 200 is delayed as a result of late vehicle collision detection or the like, or in cases in which a vehicle collision cannot be detected as a result of a sensor fault or the like, resulting in the pre-tensioner mechanism 200 not being actuated.

Moreover, in the present exemplary embodiment, as illustrated in FIG. 7, the first engagement groove 228 and the second engagement groove 234 are inclined in the manner described above. Accordingly, in a state in which the center of the engaging portion 238 of the coupling pin 212 is positioned even slightly further toward the closed end side of the first engagement groove 228 and the second engagement groove 234 than open end 228A, 234A sides, when the first link plate 208 rotates and the coupling pin 212 abuts the sides of the open ends 228A, 234A of the first engagement groove 228 and the second engagement groove 234, the coupling pin 212 is scooped in toward the closed end side of the first engagement groove 228 and the second engagement groove 234. Namely, a state is attained in which the coupling pin 212 is engaged with the first link plate 208 and the second link plate 210.

By contrast, in a state in which the center of the engaging portion 238 of the coupling pin 212 is positioned even slightly further to the radial direction outer side of the first link plate 208 and the second link plate 210 than the open ends 228A, 234A of the first engagement groove 228 and the second engagement groove 234, when the first link plate 208 rotates and the coupling pin 212 abuts the sides of the open ends 228A, 234A of the first engagement groove 228 and the second engagement groove 234, the coupling pin 212 is pushed away toward the opposite direction to the closed end sides of the first engagement groove 228 and the second engagement groove 234. Namely, a state is attained in which the coupling pin 212 is not engaged with the first link plate 208 and the second link plate 210.

As described above, in the present exemplary embodiment, in a state in which the center of the engaging portion 238 of the coupling pin 212 is positioned even slightly further toward the closed end side of the first engagement groove 228 and the second engagement groove 234 than the open ends 228A, 234A, the coupling pin 212 can be placed in a state of engagement with the first link plate 208 and the second link plate 210. Moreover, in a state in which the center of the engaging portion 238 of the coupling pin 212 is positioned even slightly further toward the radial direction outside of the first link plate 208 and the second link plate 210 than the open ends of the first engagement groove 228 and the second engagement groove 234, the coupling pin 212 can be placed in a non-engaged state with respect to the first link plate 208 and the second link plate 210.

Note that in the present exemplary embodiment, explanation has been given regarding an example in which the first engagement groove 228 and the second engagement groove 234 are inclined toward either the one circumferential direction side or the other circumferential direction side on progression toward the closed end side. However, the present invention is not limited thereto, and, for example, configuration may be made in which the first engagement groove 228 and the second engagement groove 234 are not inclined toward the one circumferential direction side or the other circumferential direction side.

Moreover, in the present exemplary embodiment, explanation has been given regarding an example in which the force limiter load value is switched by the force limiter load switching mechanism 120 configured including the first link plate 208, the second link plate 210, the coupling pin 212, the pawl 150, the lock ring 190, and the engagement switching mechanism 214. However, the present invention is not limited thereto. Namely, the force limiter load value may be switched using a force limiter load switching mechanism of another configuration that is capable of switching the force limiter load value on being input with a portion of an actuation force that actuates a pre-tensioner mechanism.

Moreover, in the present exemplary embodiment, explanation has been given regarding an example of a configuration in which the force limiter load value is switched from a high load value to a low load value by actuating the pre-tensioner mechanism 200. However, the present invention is not limited thereto. For example, configuration may be made in which the force limiter load value is switched from a low load value to a high load value by actuation of the pre-tensioner mechanism 200 in cases in which the webbing 22 is being worn by an occupant with a large build.

Second Exemplary Embodiment

Next, explanation follows regarding a webbing take-up device according to a second exemplary embodiment of the present invention, with reference to FIG. 8 to FIG. 11. Note that members and sections equivalent to those of the above exemplary embodiment are allocated the same reference numerals as in the above exemplary embodiment, and explanation thereof is omitted.

Figure 8:
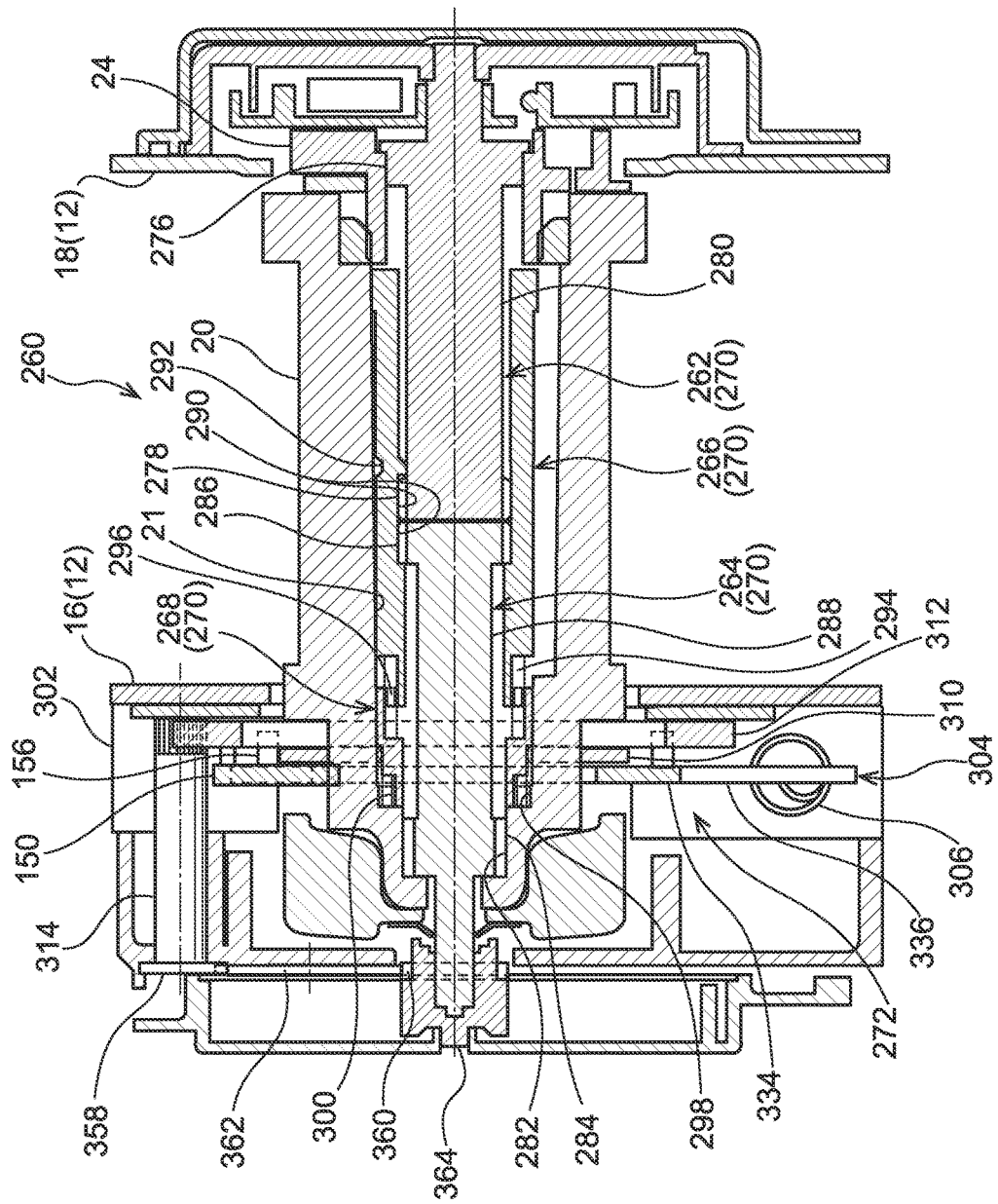
FIG. 8 is a cross-section illustrating a webbing take-up device according to a second exemplary embodiment.
Figure 9:
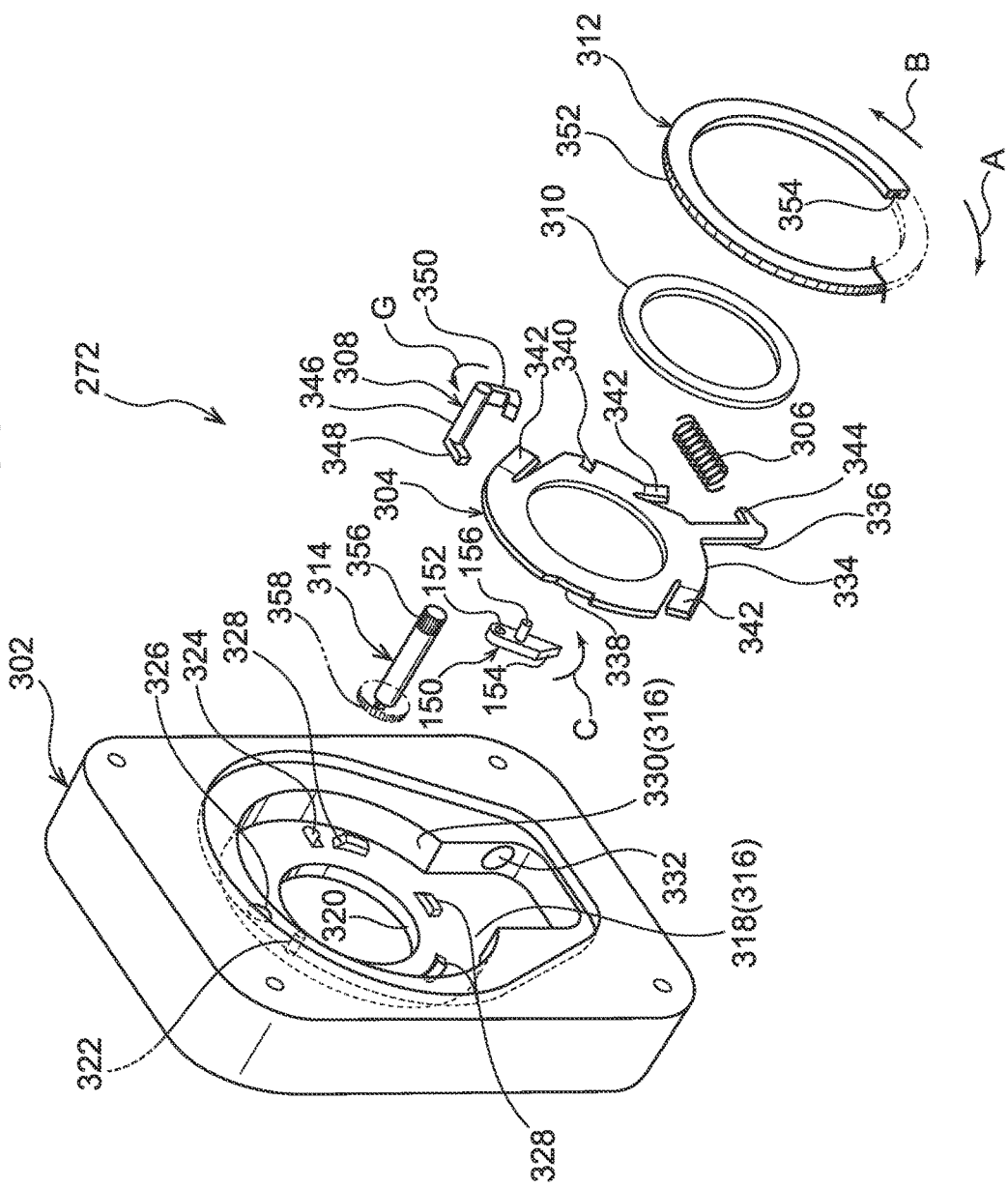
FIG. 9 is an exploded perspective view illustrating a configuration of a force limiter load switching mechanism of the webbing take-up device illustrated in FIG. 8.
Figure 11:
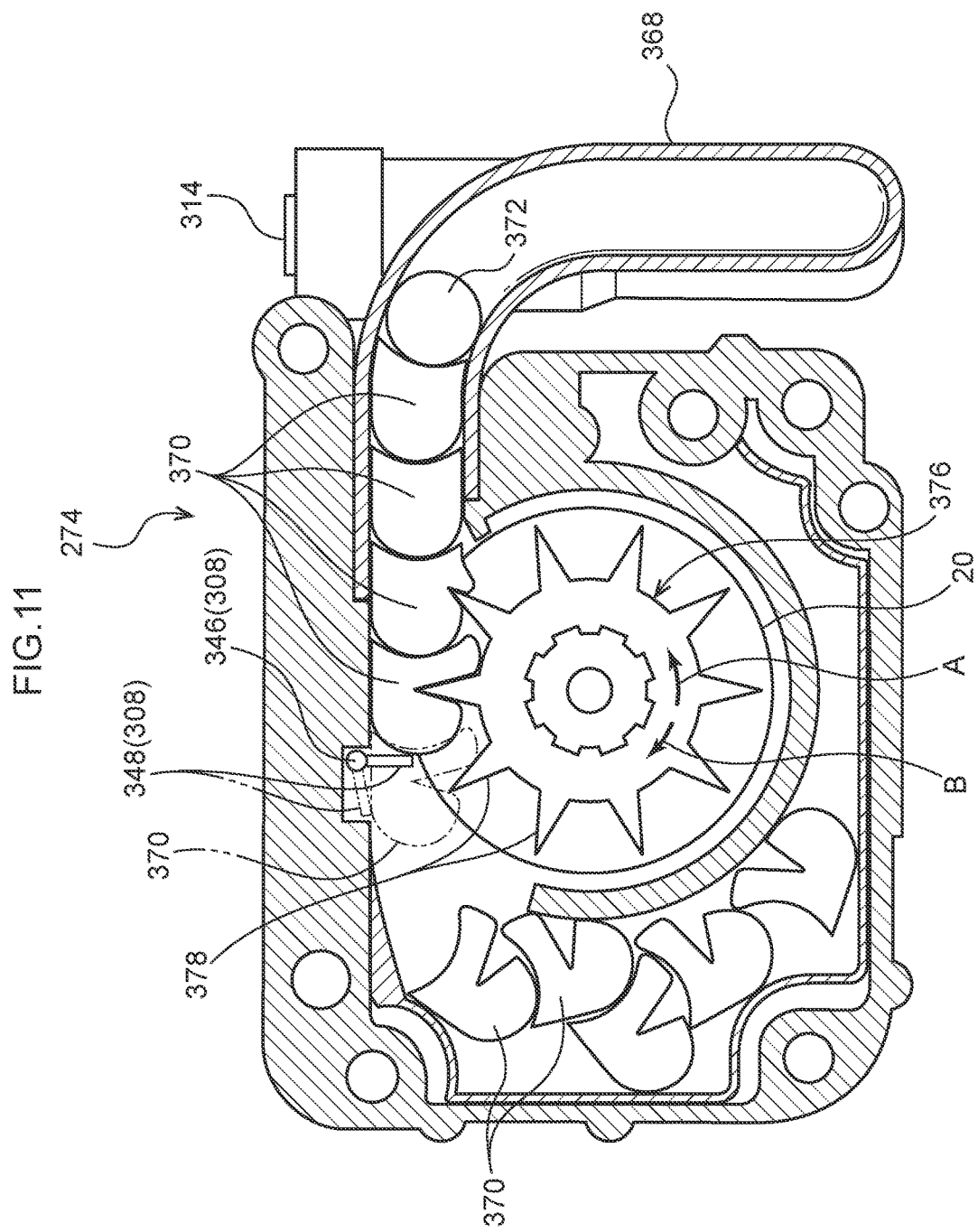
FIG. 11 is a cross-section illustrating a configuration of a pre-tensioner mechanism of the webbing take-up device illustrated in FIG. 8.

As illustrated in FIG. 8 and FIG. 9, instead of the force limiter mechanism 31 of the exemplary embodiment described above, a webbing take-up device 260 of the present exemplary embodiment is provided with a force limiter mechanism 270 configured including a first torsion shaft 262, a second torsion shaft 264, a connection tube 266, and a slider tube 268. The webbing take-up device 260 is also provided with a force limiter load switching mechanism 272 corresponding to the force limiter load switching mechanism 120 of the first exemplary embodiment. Moreover, as illustrated in FIG. 11, the webbing take-up device 260 of the present exemplary embodiment is provided with a pre-tensioner mechanism 274 corresponding to the pre-tensioner mechanism 200 of the exemplary embodiment described above.

As illustrated in FIG. 8, one end portion of the first torsion shaft 262 is configured by a first engaging portion 276 that engages with the engaged portion 30 of the lock gear 24, and another end portion of the first torsion shaft 262 is configured by a second engaging portion 278 that engages with the connection tube 266, described later. Moreover, a location of the first torsion shaft 262 between the first engaging portion 276 and the second engaging portion 278 is configured by a first energy absorption section 280 that absorbs kinetic energy of the occupant which may be used to pull the webbing 22.

One end portion of the second torsion shaft 264 is configured by a first engaging portion 284 that engages with a spline shaped engaged portion 282 formed to the spool 20, and another end portion of the second torsion shaft is configured by a second engaging portion 286 that engages with the connection tube 266, described later. Moreover, a location of the second torsion shaft 264 between the first engaging portion 284 and the second engaging portion 286 is configured by a second energy absorption section 288 set with a smaller diameter than the first energy absorption section 280 of the first torsion shaft 262.

The connection tube 266 is formed in a tube shape, inside which the first torsion shaft 262 and the second torsion shaft 264 are disposed. An axial direction intermediate portion at an inner periphery of the connection tube 266 is formed with a spline shaped engaged portion 290, with which the second engaging portion 278 of the first torsion shaft 262 and the second engaging portion 286 of the second torsion shaft 264 engage. The second engaging portion 278 of the first torsion shaft 262 and the second engaging portion 286 of the second torsion shaft 264 engage with the engaged portion 290 so as to connect the first torsion shaft 262 and the second torsion shaft 264 together through the connection tube 266, such that the first torsion shaft 262 and the second torsion shaft 264 are capable of rotating together as a unit. Note that in the present exemplary embodiment, a portion 292 of the connection tube 266 is crimped in order to prevent the first torsion shaft 262 and the second torsion shaft 264 from falling out of the connection tube 266 during assembly of the webbing take-up device 260. An outer peripheral face of an end portion on the second torsion shaft 264 side of the connection tube 266 is formed with an engaged portion 294 with which the slider tube 268, described later, engages.

The slider tube 268 is formed in a tube shape, inside which the second torsion shaft 264 is disposed. An inner peripheral face of an end portion on one side of the slider tube 268 is formed with an engaging portion 296 that engages with the engaged portion 294 of the connection tube 266. The slider tube 268 is capable of sliding in the axial direction of the connection tube 266 while the engaging portion 296 of the slider tube 268 and the engaged portion 294 of the connection tube 266 remain engaged with each other. Moreover, an outer peripheral face of an end portion on another side of the slider tube 268 is formed with an engaging portion 300 that engages with a spline shaped engaged portion 298 formed at the spool 20. Moreover, the engagement between the engaging portion 300 of the slider tube 268 and the engaged portion 298 of the spool 20 is released when the slider tube 268 slides toward a connection tube 266 side.

As illustrated in FIG. 9, the force limiter load switching mechanism 272 is configured including a housing 302 attached to the leg plate 16 of the frame 12 (see FIG. 8), a rotating body 304 disposed inside the housing 302, a spring 306, a trigger member 308, the pawl 150, a slide plate 310, a cam ring 312, and a cam ring rotation shaft 314.

The housing 302 is formed in a box shape that has a bottom and is open on the frame 12 side. The housing 302 is formed with a depression 316 in which the rotating body 304, the spring 306, the trigger member 308, the pawl 150, the slide plate 310, the cam ring 312, and the like are disposed. A central portion of a bottom wall 318 of the depression 316 is formed with a circular opening 320. The bottom wall 318 of the depression 316 is also provided with a shaft 322 that stands out so as to be inserted through the support hole 152 in the pawl 150 so as to tiltably support the pawl 150.

The bottom wall 318 of the depression 316 is further formed with a first insertion hole 324 through which the trigger member 308 is inserted and that supports the trigger member 308, and a second insertion hole 326 through which the cam ring rotation shaft 314 is inserted and that supports the cam ring rotation shaft 314.

Moreover, the bottom wall 318 of the depression 316 is formed with three protrusions 328 projecting out toward the frame 12 side. An end portion on another circumferential direction side (arrow B direction side) of each protrusion 328 is set such that the projection amount from the bottom wall 318 of the depression 316 gradually increases on progression toward the one circumferential direction side (arrow A direction side), and an end portion on the one circumferential direction side (arrow A direction side) of each protrusion 328 is set with a uniform projection amount from the bottom wall 318 of the depression 316.

A side wall 330 of the depression 316 is formed with a spring placement hole 332 that is closed at a depth direction end portion and in which the spring 306, described later, is disposed.

The rotating body 304 is, for example, formed by pressing a sheet steel material. The rotating body 304 includes a ring shaped portion 334 formed in a ring shape, and a projection portion 336 that projects out from an outer peripheral portion of the ring shaped portion 334 toward a radial direction outer side. An outer peripheral portion of the ring shaped portion 334 is formed with a first notch 338 with which the engaging portion 154 of the pawl 150 engages. Rotation of the rotating body 304 is restricted by the engagement of the engaging portion 154 of the pawl 150 with the first notch 338. Moreover, when the insertion pin 156 of the pawl 150 moves inside a cam groove 354 formed in the cam ring 312, described later, the pawl 150 is tilted in the opposite direction to the arrow C direction so as to adopt a state in which the engaging portion 154 of the pawl 150 is not engaged with the first notch 338. Rotation of the rotating body 304 is thus permitted.

The outer peripheral portion of the ring shaped portion 334 is formed with a second notch 340, in which an anchor tab 350 of the trigger member 308, described later, is anchored.

The outer peripheral portion of the ring shaped portion 334 is further formed with three inclined tabs 342. The inclined tabs 342 are inclined gently toward the frame 12 side on progression toward the one circumferential direction side (arrow A direction side). When the rotating body 304 rotates toward the one circumferential direction side, the three inclined tabs 342 ride up over the three protrusions 328 formed at the housing 302, such that the rotating body 304 moves toward the frame 12 side.

Moreover, a leading end portion of the projection portion 336 is formed with a spring anchor portion 344 that projects out toward another circumferential direction side (arrow B direction side) and to which an end portion of the spring 306, described later, is anchored.

The spring 306, serving as an urging member, is configured by a compression coil spring. The spring 306 is disposed inside the spring placement hole 332 formed at the depression 316 in a state in which the spring 306 is compressed along its length (in a compressed state). Moreover, one end portion of the spring 306 is anchored to the spring anchor portion 344 of the rotating body 304. The elastic force of the spring 306 urges the rotating body 304 in a direction to rotate toward the one circumferential direction side (in the arrow A direction).

The trigger member 308 includes a columnar portion 346 formed in a circular column shape extending along the axial direction, an input tab 348 that extends from an end portion on one side of the columnar portion 346 toward a radial direction outer side, and that is input with a portion of an actuation force that actuates the pre-tensioner mechanism 274, described later, and the anchor tab 350 that extends from an end portion on another side of the columnar portion 346 toward a radial direction outer side and that is formed in a substantially L-shape as viewed along the axial direction. The anchor tab 350 engages with the second notch 340 of the rotating body 304 so as to restrict the rotating body 304 from rotating under the urging force from the spring 306. When the pre-tensioner mechanism 274 actuates and the trigger member 308 swings in the arrow G direction, a state is attained in which the anchor tab 350 is not engaged with the second notch 340 of the rotating body 304, and the rotating body 304 is permitted to rotate under the urging force of the spring 306.

The slide plate 310 is formed in a ring shape having a larger external diameter than an internal diameter of the ring shaped portion 334 of the rotating body 304, and a smaller external diameter than an internal diameter of the cam ring 312, described later. The slide plate 310 is retained on an end portion of the spool 20 so as to be capable of moving in the axial direction. The slide plate 310 is moved toward the frame 12 side as a result of being pushed by the ring shaped portion 334 of the rotating body 304. Moreover, an inner peripheral portion of the slide plate 310 pushes an outer peripheral portion of the slider tube 268 so as to slide the slider tube 268 toward the connection tube 266 side. The engagement between the engaging portion 300 of the slider tube 268 and the engaged portion 298 of the spool 20 is thereby released.

The cam ring 312 is formed in a ring shape that is formed with gear teeth 352 at an outer peripheral portion to give a spur gear profile. The cam groove 354 is formed along a circumferential direction of the cam ring 312 on a rotating body 304 side of the cam ring 312. The cam groove 354 is formed so as to be open on the rotating body 304 side.

Figure 10:
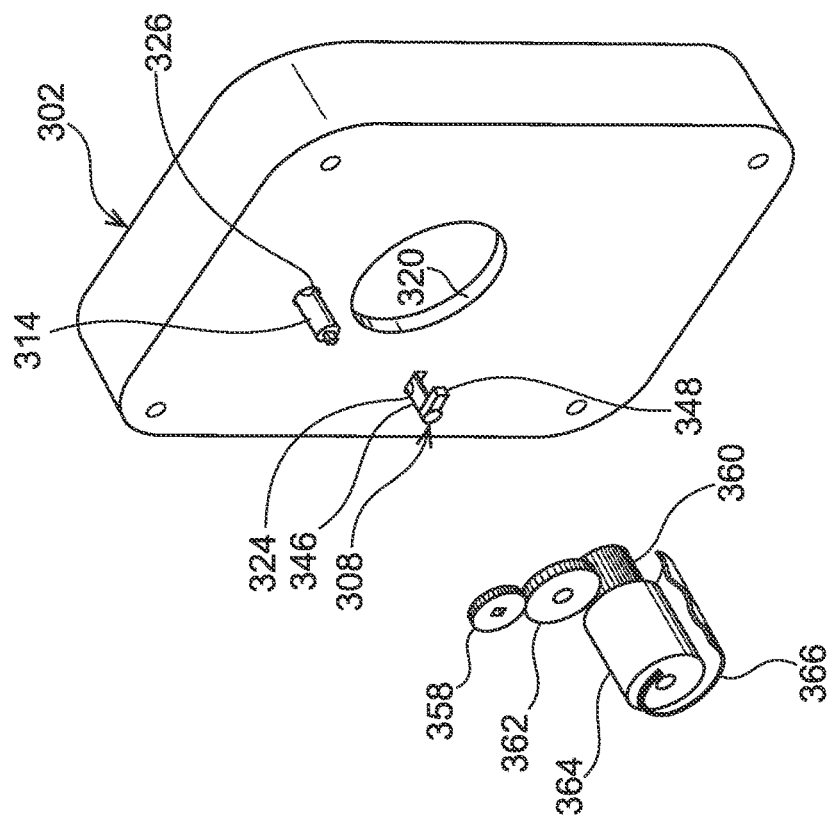
FIG. 10 is an exploded perspective view illustrating a configuration of a speed reduction mechanism and the like of the webbing take-up device illustrated in FIG. 8.

The cam ring rotation shaft 314 is formed in a circular column shape extending in the axial direction. One end portion of the cam ring rotation shaft 314 is formed with gear teeth 356 that mesh together with the gear teeth 352 of the cam ring 312. A final gear 358 is attached to another end portion of the cam ring rotation shaft 314. Moreover, as illustrated in FIG. 9 and FIG. 10, rotation of the spool 20 is transmitted through a primary gear 360, a counter gear 362, the final gear 358, and the cam ring rotation shaft 314 to the cam ring 312, thereby rotating the cam ring 312. Note that in the present exemplary embodiment, the primary gear 360 is formed at a spring adaptor 364 that is fixed to an end portion of the second torsion shaft 264, and one end portion of a flat spiral spring 366 that urges the spool 20 toward the take-up direction is anchored to the spring adaptor 364.

When a predetermined length of the webbing 22 is pulled out from a state completely taken up onto the spool 20, a state in which the engaging portion 154 of the pawl 150 is not engaged with the first notch 338 of the rotating body 304 is maintained even when the insertion pin 156 of the pawl 150 moves inside the cam groove 354 formed in the cam ring 312. Moreover, when in excess of the predetermined length of the webbing 22 is pulled out from the spool 20, the insertion pin 156 of the pawl 150 tilts toward the arrow C direction as a result of moving inside the cam groove 354 formed in the cam ring 312. The engaging portion 154 of the pawl 150 thus adopts a state of engagement with the first notch 338. Note that similarly to in the first exemplary embodiment, in the present exemplary embodiment, setting is made such that when the webbing 22 is being worn by an occupant of small build, the length of the webbing 22 pulled out from the spool 20 does not exceed the predetermined length, and when the webbing 22 is being worn by an occupant of large build, the length of the webbing 22 pulled out from the spool 20 does exceed the predetermined length.

As illustrated in FIG. 11, the pre-tensioner mechanism 274 is configured including a cylinder 368, plural moving members 370 disposed inside the cylinder 368, a piston ball 372 that pushes the moving members 370, a gas generator 374 to which one end portion of the cylinder 368 is attached, and a rotated member 376 that is fixed to one axial direction end portion of the spool 20. The cylinder 368 is formed by bending a steel pipe material into a predetermined shape, and the plural moving members 370, each of which is formed in a substantially circular column shape, are inserted into the cylinder 368 at the opposite side to the side attached with the gas generator 374. The spherically-formed piston ball 372 is inserted into the cylinder 368 from the side at which the gas generator 374 is attached. The piston ball 372 utilizes an increase in pressure inside the cylinder 368 caused by high pressure gas generated by actuation of the gas generator 374 in order to push the moving members 370. The plural moving members 370 thereby move through the inside of the cylinder 368 before pushing teeth 378 formed at an outer peripheral portion of the rotated member 376. The rotated member 376 is thereby rotated in the take-up direction (arrow A direction) together with the spool 20.

Moreover, in the present exemplary embodiment, the moving members 370 push the input tab 348 of the trigger member 308 so as to swing the trigger member 308 in the arrow G direction as illustrated in FIG. 9, thereby attaining a state in which the anchor tab 350 of the trigger member 308 is no longer engaged with the second notch 340 of the rotating body 304.

Operation and Advantageous Effects of the Present Exemplary Embodiment

Next, explanation follows regarding operation and advantageous effects of the present exemplary embodiment.

As illustrated in FIG. 8 to FIG. 11, in the webbing take-up device 260 of the present exemplary embodiment, in a state in which the webbing 22 is being worn over the body of an occupant of the vehicle, when the gas generator 374 actuates as a result of a vehicle collision, for example, the piston ball 372 moves the plural moving members 370. The moving members 370 that have been moved push the teeth 378 of the rotated member 376 so as to rotate the rotated member 376 in the take-up direction together with the spool 20, such that a predetermined length of the webbing 22 is taken up onto the spool 20. This thereby removes any slack in the webbing worn by the occupant.

The moving members 370 that have been moved by actuation of the gas generator 374 push the input tab 348 of the trigger member 308. The trigger member 308 accordingly swings toward the arrow G direction to attain a state in which the anchor tab 350 of the trigger member 308 is not engaged with the second notch 340 of the rotating body 304.

In a state in which the webbing 22 is being worn by an occupant of large build, and the engaging portion 154 of the pawl 150 is accordingly engaged with the first notch 338 of the rotating body 304, the pawl 150 prevents rotation of the rotating body 304 even when the engagement between the anchor tab 350 of the trigger member 308 and the second notch 340 of the rotating body 304 has been released. Accordingly, a state is maintained in which the engaging portion 296 of the slider tube 268 and the engaged portion 294 of the connection tube 266 are engaged with each other, and the engaging portion 300 of the slider tube 268 and the engaged portion 298 of the spool 20 are engaged with each other. The spool 20 is thereby maintained in a state connected to the second engaging portion 278 of the first torsion shaft 262 through the slider tube 268 and the connection tube 266. Moreover, rotation of the lock gear 24 in the pull-out direction is prevented when the lock mechanism is actuated in this state. Pull-out direction rotation of the spool 20 that is coupled to the lock gear 24 through the first torsion shaft 262, the connection tube 266, and the slider tube 268 is restricted as a result, thereby restricting the webbing 22 from being pulled out from the spool 20. The body of the occupant of large build attempting to move toward the front of the vehicle is accordingly restrained by the webbing 22.

Moreover, in a state in which pull-out direction rotation of the lock gear 24 is prevented, should the body of the occupant of large build pull on the webbing 22 with an even larger force, such that a rotational force acting on the spool 20 in the pull-out direction as a result of this pulling force exceeds the torsion-withstand load (deformation-withstand load) of the first energy absorption section 280 of the first torsion shaft 262, the first energy absorption section 280 twists (deforms) so as to permit pull-out direction rotation of the spool 20. Namely, the force limiter load value is the torsion-withstand load of the first energy absorption section 280, and pull-out direction rotation of the spool is permitted when the rotational force acting in the spool 20 as a result of the pulling force exceeds the torsion-withstand load of the first energy absorption section 280.

Accordingly, a load (burden) acting on the chest of the occupant of large build from the webbing 22 is lessened by the spool 20 rotating in the pull-out direction and the webbing 22 being pulled out from the spool 20 as a result of the first energy absorption section 280 twisting. Moreover, kinetic energy of the occupant of large build which may be used to pull the webbing 22 is absorbed in an amount commensurate with the torsion of the first energy absorption section 280.

By contrast, in a state in which the webbing 22 is being worn by an occupant of small build, and the engaging portion 154 of the pawl 150 is accordingly not engaged with the first notch 338 of the rotating body 304, the gas generator 374 of the pre-tensioner mechanism 274 is actuated such that the moving members 370 that have moved release the engagement between the anchor tab 350 of the trigger member 308 and the second notch 340 of the rotating body 304. The rotating body 304 thus rotates toward the one circumferential direction side (arrow A direction side) under the urging force of the spring 306. Moreover, when the rotating body 304 rotates toward the one circumferential direction side, the three inclined tabs 342 of the rotating body 304 respectively ride over the three protrusions 328 formed to the housing 302 such that the rotating body 304 moves toward the frame 12 side. Accordingly, the slide plate 310 is pushed by the ring shaped portion 334 of the rotating body 304 such that the slide plate 310 moves toward the frame 12 side. The inner peripheral portion of the slide plate 310 pushes the outer peripheral portion of the slider tube 268, such that the slider tube 268 slides toward the connection tube 266 side. The engagement between the engaging portion 300 of the slider tube 268 and the engaged portion 298 of the spool 20 is thereby released, thus releasing the connected state of the spool 20 to the second engaging portion 278 of the first torsion shaft 262 through the slider tube 268 and the connection tube 266.

In a state in which pull-out direction rotation of the lock gear 24 is prevented, should the body of the occupant of small build pull on the webbing 22 with an even larger force, a rotational force acting on the spool 20 in the pull-out direction as a result of this pulling force is applied to the second torsion shaft 264, the connection tube 266, and the first torsion shaft 262. Should this rotational force exceed the torsion-withstand load (deformation-withstand load) of the second energy absorption section 288 of the second torsion shaft 264, the second energy absorption section 288 twists (deforms) so as to permit pull-out direction rotation of the spool 20. Note that the second energy absorption section 288 of the second torsion shaft 264 has the smallest external diameter out of the first torsion shaft 262, the connection tube 266, and the second torsion shaft 264. Namely, the force limiter load value is the torsion-withstand load of the second energy absorption section 288, and pull-out direction rotation of the spool is permitted when the rotational force acting on the spool 20 as a result of the pulling force from the body of the occupant exceeds the torsion-withstand load of the second energy absorption section 288.

Accordingly, the load (burden) acting on the chest of the occupant of small build from the webbing 22 is lessened due to the spool 20 rotating in the pull-out direction and the webbing 22 being pulled out from the spool 20 as a result of the second energy absorption section 288 undergoing torsion. Moreover, kinetic energy of the occupant of small build which may be used to pull the webbing 22 is absorbed in an amount commensurate with the torsion of the second energy absorption section 288.

As described above, in the present exemplary embodiment, the force limiter load value is set to the torsion-withstand load of the first energy absorption section 280 when the webbing 22 is being worn by an occupant of large build. Namely, the force limiter load value is set to a high load value. On the other hand, the force limiter load value is set to the torsion-withstand load of the second energy absorption section 288 when the webbing 22 is being worn by an occupant of small build and the pre-tensioner mechanism 274 is actuated. Namely, the force limiter load value is set to a low load value. This thereby enables appropriate occupant protection according to the build of the occupant.

In the present exemplary embodiment, configuration is made in which the rotating body 304 is rotated by the urging force of the spring 306, thereby enabling the energy value input from the pre-tensioner mechanism 274 to the force limiter load switching mechanism 272 to be made smaller. Namely, the proportion of the kinetic energy of the moving members 370 that is employed as energy to rotate the rotating body 304 can be reduced.

Explanation has been given regarding exemplary embodiments of the present invention. However, the present invention is not limited to the above, and obviously various other modifications may be implemented within a range not departing from the spirit of the present invention.

The disclosure of Japanese Patent Application No. 2015-45135 is incorporated in its entirety by reference herein.

All cited documents, patent applications, and technical standards mentioned in the present specification are incorporated by reference in the present specification to the same extent as if the individual cited document, patent application, or technical standard was specifically and individually indicated to be incorporated by reference.

The invention claimed is:

1. A webbing take-up device, comprising:
    a spool taking up a webbing, which is configured to be worn by an occupant, by being rotated in a take-up direction, and rotated in a pull-out direction by the webbing being pulled out;
    a pre-tensioner mechanism taking up the webbing onto the spool by rotating the spool in the take-up direction in a vehicle emergency;
    a lock mechanism restricting pull-out direction rotation of the spool in a vehicle emergency;
    a force limiter mechanism permitting pull-out direction rotation of the spool in a case in which the lock mechanism has restricted pull-out direction rotation of the spool, the force limiter mechanism being configured to set a force limiter load value, at which the force limiter mechanism actuates, to a high load value or to a low load value; and
    a force limiter load switching mechanism switching the force limiter load value by being input with a portion of an actuation force that actuates the pre-tensioner mechanism and that is input by a member that is moved so as to rotate the spool in the take-up direction.

2. The webbing take-up device of claim 1, wherein the force limiter load value is switchable from a high load value to a low load value upon actuation of the pre-tensioner mechanism.

3. The webbing take-up device of claim 1, wherein the force limiter load switching mechanism comprises:
    a rotating body that switches the force limiter load value by being rotated toward one side;
    an urging member that urges the rotating body toward the one side; and
    a trigger member that prevents rotation of the rotating body by engaging with the rotating body, and that is released from engagement with the rotating body by being input with a portion of the actuation force that actuates the pre-tensioner mechanism.

4. The webbing take-up device of claim 3, further comprising a rotation restriction member that restricts rotation of the rotating body by engaging with the rotating body, and that is displaced between a state of engagement with the rotating body and a state of non-engagement with the rotating body.

5. The webbing take-up device of claim 1, wherein the force limiter load switching mechanism switches the force limiter load value according to an amount of the webbing that is pulled out from the spool.

6. The webbing take-up device of claim 1, wherein the force limiter load switching mechanism is configured to set the force limiter load value to a high load value or a low load value in accordance with an amount of the webbing that is pulled out from the spool, and the force limiter load switching mechanism switches between the high load value and the low load value.

7. A webbing take-up device, comprising:
    a spool taking up a webbing, which is configured to be worn by an occupant, by being rotated in a take-up direction, and rotated in a pull-out direction by the webbing being pulled out;
    a pre-tensioner mechanism taking up the webbing onto the spool by rotating the spool in the take-up direction in a vehicle emergency;
    a lock mechanism restricting pull-out direction rotation of the spool in a vehicle emergency;
    a force limiter mechanism permitting pull-out direction rotation of the spool in a case in which the lock mechanism has restricted pull-out direction rotation of the spool, the force limiter mechanism being configured to set a force limiter load value, at which the force limiter mechanism actuates, to a high load value or to a low load value; and
    a force limiter load switching mechanism switching the force limiter load value by being input with a portion of an actuation force that actuates the pre-tensioner mechanism,
    wherein the force limiter load switching mechanism comprises:
    a first rotating body that is rotated by being input with a portion of the actuation force that actuates the pre-tensioner mechanism;
    a second rotating body that is rotated by rotational force transmitted from the first rotating body;
    a coupling member that engages with the first rotating body and the second rotating body so as to couple the first rotating body with the second rotating body to enable the first rotating body and the second rotating body to rotate together as a unit, or that adopts a state of non-engagement with the first rotating body and the second rotating body such that rotational force of the first rotating body is not transmitted to the second rotating body;
    a switching rotating body that switches the force limiter load value by being switched to a rotation-restricted state or a rotation-enabled state; and
    a rotation restriction member that is provided between the second rotating body and the switching rotating body, that restricts rotation of the switching rotating body by engaging with the switching rotating body, and that is displaced between a state of engagement with the switching rotating body and a state of non-engagement with the switching rotating body when the second rotating body is rotated.

8. The webbing take-up device of claim 7, wherein:

the first rotating body and the second rotating body are each formed in a circular plate shape;

a first rotating body side engagement groove for the coupling member to engage with is formed at an outer peripheral portion of the first rotating body, the first rotating body side engagement groove being open at a radial direction outer side and closed at a radial direction inner side and being inclined toward one side in a circumferential direction on progression toward the radial direction inner side; and a second rotating body side engagement groove for the coupling member to engage with is formed at an outer peripheral portion of the second rotating body, the second rotating body side engagement groove being open at a radial direction outer side and closed at a radial direction inner side, and being inclined toward another side in the circumferential direction on progression toward the radial direction inner side.

* * * * *